(12) United States Patent
Takasawa et al.

(10) Patent No.: US 11,036,121 B2
(45) Date of Patent: Jun. 15, 2021

(54) WAVELENGTH CONVERSION DEVICE AND PROJECTION-TYPE DISPLAY APPARATUS

(71) Applicant: SONY CORPORATION, Tokyo (JP)

(72) Inventors: Takeharu Takasawa, Kanagawa (JP); Izushi Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/647,710

(22) PCT Filed: Aug. 17, 2018

(86) PCT No.: PCT/JP2018/030544
§ 371 (c)(1),
(2) Date: Mar. 16, 2020

(87) PCT Pub. No.: WO2019/069566
PCT Pub. Date: Apr. 11, 2019

(65) Prior Publication Data
US 2020/0278599 A1    Sep. 3, 2020

(30) Foreign Application Priority Data

Oct. 5, 2017    (JP) .............................. JP2017-194977

(51) Int. Cl.
*G03B 21/20*    (2006.01)
*H04N 9/31*    (2006.01)

(52) U.S. Cl.
CPC ......... *G03B 21/204* (2013.01); *H04N 9/3155* (2013.01)

(58) Field of Classification Search
CPC ... G03B 21/204; H04N 9/3155; H04N 9/3158
See application file for complete search history.

(56) References Cited

U.S. PATENT DOCUMENTS

| 2014/0375959 A1 | 12/2014 | Yang et al. |
| 2015/0261076 A1 | 9/2015 | Dijken et al. |
| 2016/0377967 A1 | 12/2016 | Ando et al. |

FOREIGN PATENT DOCUMENTS

| CN | 102645830 | 8/2012 |
| JP | 2012-018209 | 1/2012 |
| JP | 2012-185402 | 9/2012 |
| JP | 2014-527261 | 10/2014 |
| JP | 2015-121634 | 7/2015 |
| JP | 2015-143824 | 8/2015 |
| JP | 2016-170326 | 9/2016 |
| WO | WO 2014/024218 | 2/2014 |

OTHER PUBLICATIONS

International Search Report prepared by the Japan Patent Office dated Oct. 18, 2018, for International Application No. PCT/JP2018/030544.

*Primary Examiner* — Joseph L Williams
(74) *Attorney, Agent, or Firm* — Sheridan Ross P.C.

(57) ABSTRACT

A wavelength conversion device according to an embodiment of the present disclosure includes a first base member, a second base member opposed to the first base member, and a phosphor layer with which a first space is filled. The second base member has a surface opposed to the first base member. The surface has an annular recessed portion. The recessed portion includes therein a plurality of protruding portions extending from an inner peripheral portion toward an outer peripheral portion. The first space is formed by the first base member and the recessed portion of the second base member.

19 Claims, 11 Drawing Sheets ical field

WAVELENGTH CONVERSION DEVICE AND PROJECTION-TYPE DISPLAY APPARATUS

CROSS REFERENCE TO RELATED APPLICATIONS

This application is a national stage application under 35 U.S.C. 371 and claims the benefit of PCT Application No. PCT/JP2018/030544 having an international filing date of 17 Aug. 2018, which designated the United States, which PCT application claimed the benefit of Japanese Patent Application No. 2017-194977 filed 5 Oct. 2017, the entire disclosures of each of which are incorporated herein by reference.

TECHNICAL FIELD

The present disclosure relates, for example, to a wavelength conversion device that converts excitation light into fluorescent light to output it, and a projection-type display apparatus that includes the wavelength conversion device.

BACKGROUND ART

In recent years, laser phosphor light sources have been used as a light source in a projector. In the light source, light (excitation light) of a blue semiconductor laser (laser diode; LD) is caused to enter a wavelength conversion device to extract fluorescent light (yellow light). This yellow light is combined with blue LD light differing from the light used in wavelength conversion. The combined light is used as white light source. In a typical laser phosphor light source, the phosphor used in a wavelength conversion device is mixed with a binder, and is fixed on a substrate (see, for example, PTL 1).

Incidentally, in a laser phosphor light source, energy of excitation light entering a phosphor portion, except for energy converted into and employed as fluorescent light, turns into heat. This causes the phosphor portion to generate heat. The increase in temperature of the phosphor portion leads to a degradation of reliability of the phosphor portion such as a breakage or a reduction in lifetime, a reduction in light conversion efficiency, or the like. Thus, there is a demand for a phosphor portion having high cooling performance. In addition, in order to improve light conversion efficiency, there is a demand for a phosphor particle having an increased packing fraction per unit volume.

From these viewpoints, development has been carried out on a so-called binderless phosphor wheel that does not use any binder. The binderless phosphor wheel has a space between a wheel substrate and a cover glass. The space is filled with phosphor particles. This makes it possible to form a phosphor portion having a high phosphor density.

CITATION LIST

Patent Literature

PTL 1: Japanese Unexamined Patent Application Publication No. 2012-185402

SUMMARY OF THE INVENTION

Incidentally, in the binderless phosphor wheel, the wheel substrate and the cover glass are joined together using an adhesive. However, the adhesive may cause outgassing due to heat transferred from the phosphor portion generating heat as a result of irradiation with excitation, which may deteriorate the reliability.

It is desirable to provide a wavelength conversion device and a projection-type display apparatus, which are able to improve the reliability.

A wavelength conversion device according to an embodiment of the present disclosure includes a first base member, a second base member, and a phosphor layer with which a first space is filled. The second base member is opposed to the first base member. The second base member has a surface opposed to the first base member. The surface has an annular recessed portion. The recessed portion includes therein a plurality of protruding portions extending from an inner peripheral portion toward an outer peripheral portion. The first space is formed by the first base member and the recessed portion of the second base member.

A projection-type display apparatus according to an embodiment of the present disclosure includes a light-source optical system, an image-generation optical system, and a projection optical system. The light-source optical system includes a wavelength conversion device. The image-generation optical system modulates light from the light-source optical system on the basis of an inputted image signal to generate image light. The projection optical system projects the image light generated in the image-generation optical system. The wavelength conversion device used in the light-source optical system has the same constituent elements as those that the wavelength conversion device according to the embodiment of the present disclosure described above has.

In the wavelength conversion device according to the embodiment and the projection-type display apparatus according to the embodiment of the present disclosure, the annular recessed portion including therein a plurality of protruding portions extending from the inner peripheral portion toward the outer peripheral portion is formed in the surface of the second base member opposed to the first base member. The surface of the second base member is opposed to the first base member. Further, the phosphor layer is formed in the first space formed by the first base member and the recessed portion. This makes it possible to reduce variation in thickness of the phosphor layer.

According to the wavelength conversion device of the embodiment and the projection-type display apparatus of the embodiment of the present disclosure, the annular recessed portion is formed in the second base member. The annular recessed portion includes therein the plurality of protruding portions extending from the inner peripheral portion toward the outer peripheral portion. In addition, the phosphor layer is formed in the first space formed by the recessed portion and the first base member. This reduces variation in thickness of the phosphor layer. Therefore, it is possible to improve reliability.

It should be noted that the effects described here are not necessarily limiting. Any effects described in the present disclosure may be proved.

MODES FOR CARRYING OUT THE INVENTION

Figure 1:
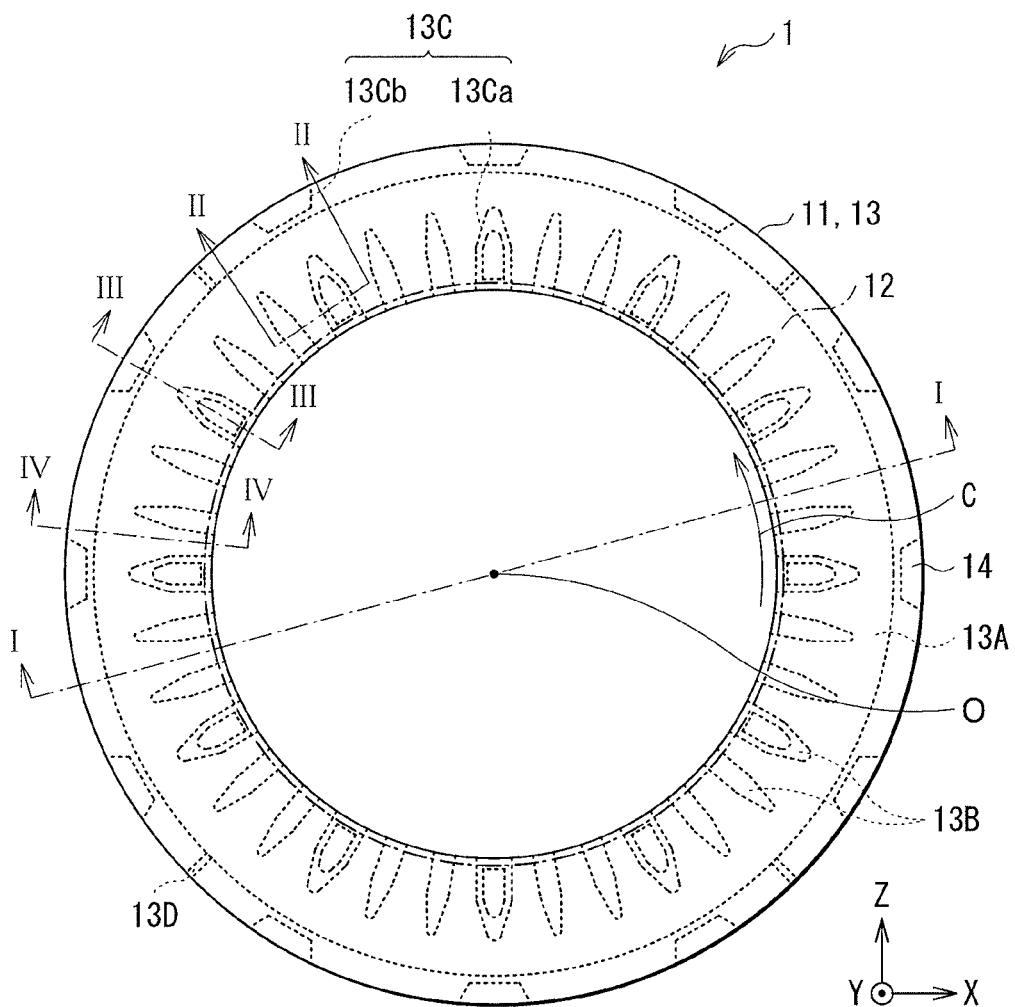
FIG. 1 is a planar schematic view of a configuration of a phosphor wheel according to a first embodiment of the present disclosure.

Below, embodiments according to the present disclosure will be described in detail with reference to the drawings. Description below is merely given as a specific example of the present disclosure. The present disclosure is not limited to the following modes. In addition, in the present disclosure, arrangement, dimensions, dimensional ratio, or the like of each constituent element are not limited to those illustrated in the drawings. Note that description will be given in the following order.

1. First Embodiment (An example of a phosphor wheel in which a cover glass includes a recessed portion, and a phosphor particle is provided between the recessed portion and a wheel substrate)
   1-1. Configuration of Phosphor Wheel
   1-2. Configuration of Light Source Unit
   1-3. Configuration of Projector
   1-4. Workings and Effects 2. Second Embodiment (An example in which a heat-dissipating fin is added, and a wheel substrate and a glass substrate are mechanically fixed)
   2-1. Configuration of Phosphor Wheel
   2-2. Workings and Effects 3. Modification Examples
   3-1. Modification Example 1 (An example in which a spiral protruding portion is provided in a recessed portion formed in a cover glass)
   3-2. Modification Example 2 (An example in which a sloped angle is provided on an end surface of a cover glass on an inner peripheral side)
   3-3. Modification Example 3 (An example in which a thin optical film is provided)
   3-4. Modification Example 4 (An example in which a recessed structure is provided on a surface of a cover glass)
   3-5. Modification Example 5 (An example of another configuration of a light source unit)

1. First Embodiment

Figure 2:
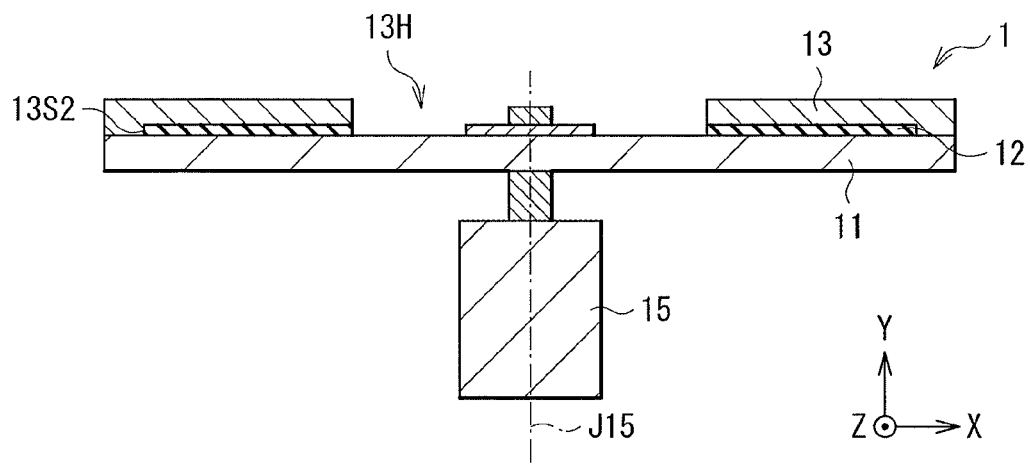
FIG. 2 is a cross-sectional view taken along a line I-I of the phosphor wheel illustrated in FIG. 1.
Figure 3:
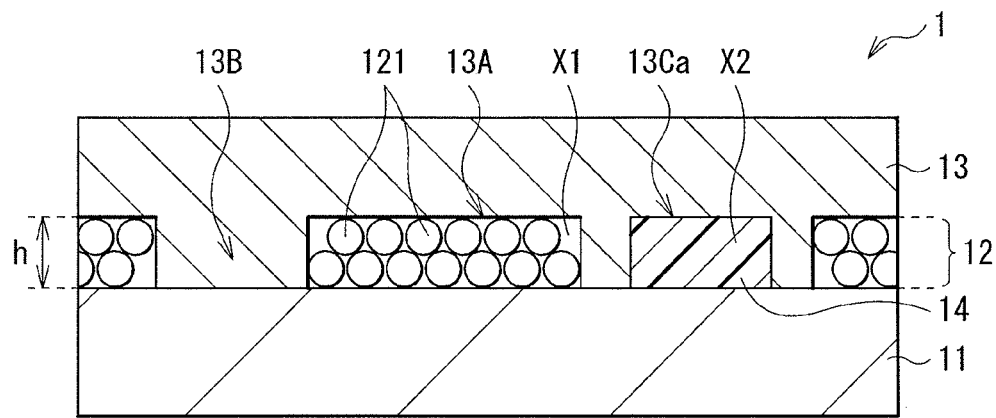
FIG. 3 is a cross-sectional view taken along a line II-II of the phosphor wheel illustrated in FIG. 1.
Figure 4:
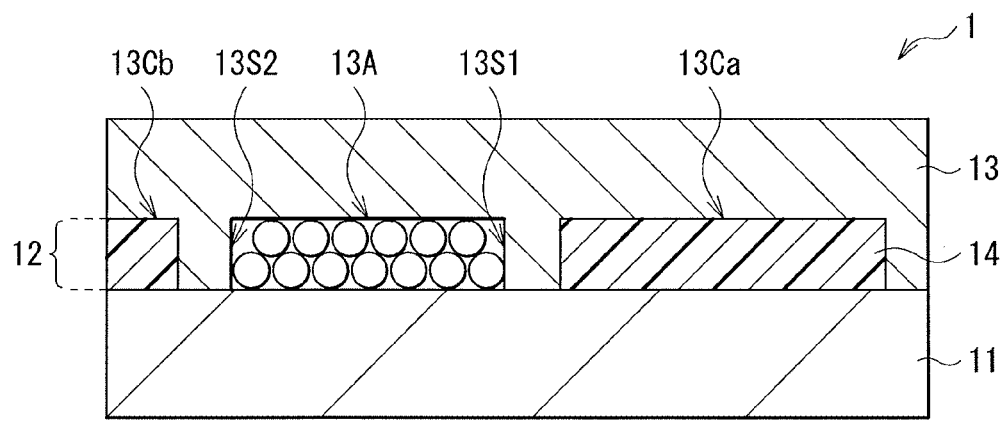
FIG. 4 is a cross-sectional view taken along a line of the phosphor wheel illustrated in FIG. 1.
Figure 5:
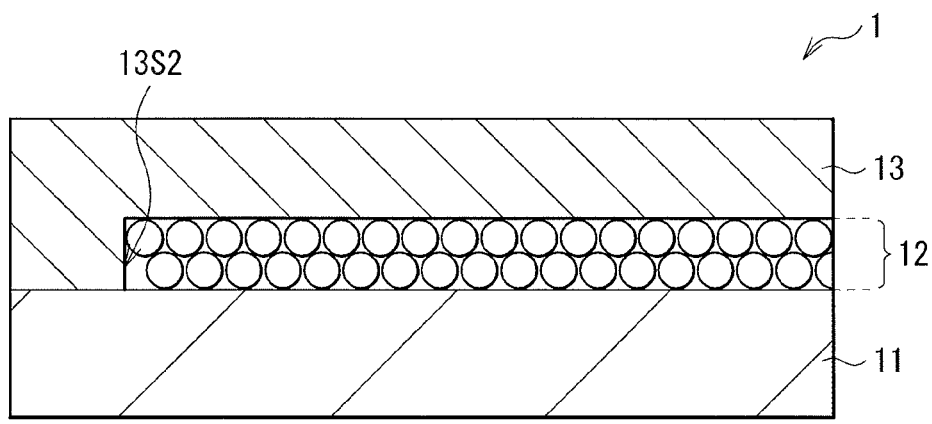
FIG. 5 is a cross-sectional view taken along a line IV-IV of the phosphor wheel illustrated in FIG. 1.

FIG. 1 is a diagram schematically illustrating a planar configuration of a wavelength conversion device (phosphor wheel 1) according to a first embodiment of the present disclosure. FIG. 2 is a diagram schematically illustrating a cross-sectional configuration taken along a line I-I of the phosphor wheel 1 illustrated in FIG. 1. FIG. 3 is a diagram schematically illustrating a cross-sectional configuration of the phosphor wheel 1 taken along a line II-II illustrated in FIG. 1. FIG. 4 is a diagram schematically illustrating a cross-sectional configuration of the phosphor wheel 1 taken along a line illustrated in FIG. 1. FIG. 5 is a diagram schematically illustrating a cross-sectional configuration of the phosphor wheel 1 taken along a line IV-IV illustrated in FIG. 1. This phosphor wheel 1 configures, for example, a light source unit (light source unit 100) of a projection-type display apparatus (projector 10), which will be described later (see FIGS. 7 and 8).

The phosphor wheel 1 according to the present embodiment has a configuration that includes a cover glass 13 (second base member) including a surface opposed to a wheel substrate 11 (first base member). The surface of the cover glass 13 includes a recessed portion 13A. The recessed portion 13A and the wheel substrate 11 form a space X1 (first space) that is filled with a phosphor particle 121. In addition, the recessed portion 13A includes therein a plurality of protruding portions 13B extending, for example, straightly from an inner peripheral portion thereof toward an outer peripheral portion thereof. The phosphor particle 121 is provided from between the plurality of protruding portions 13B.

(1-1. Configuration of Phosphor Wheel)

The phosphor wheel 1 according to the present embodiment has a configuration in which a phosphor layer 12 and the cover glass 13 are stacked in this order on the wheel substrate 11 that is able to rotate about a rotating axis (for example, a shaft J15).

The wheel substrate 11 is provided to support the phosphor layer 12. The wheel substrate 11 has, for example, a disk shape. It is preferable that the wheel substrate 11 function as a heat-dissipating member. The wheel substrate 11 includes an inorganic material such as a metallic material or a ceramic material, which has high thermal conductivity and for which mirror-finish processing is able to be applied. The material used to configure the wheel substrate 11 includes, for example, simple-substance metal such as aluminum (Al), copper (Cu), molybdenum (Mo), tungsten (W), cobalt (Co), chromium (Cr), platinum (Pt), tantalum (Ta), lithium (Li), zirconium (Zr), ruthenium (Ru), rhodium (Rh), or palladium (Pd), or an alloy containing one or more types of these materials. Alternatively, it is possible to use an alloy of CuW in which the percentage of W contained is equal to or more than 80 at %, CuMo in which the percentage of Mo contained is equal to or more than 40 at %, or the like as the metallic material used to configure the wheel substrate 11. The ceramic material includes, for example, a material containing silicon carbide (SiC), aluminum nitride (AlN), beryllium oxide (BeO), a composite material of Si and SiC, or a composite material of SiC and Al (where the percentage of SiC contained is equal to or more than 50%). For example, the wheel substrate 11 is able to rotate in a direction of an arrow C using a motor 15 with a normal passing through the center of the wheel substrate 11 being a rotating axis O.

The phosphor layer 12 includes a plurality of phosphor particles 121, and is formed in a manner such that the plurality of phosphor particles 121 is provided in a space between the wheel substrate 11 and the cover glass 13, more specifically, in a space X1 formed by the wheel substrate 11 and the recessed portion 13A that the cover glass 13 has. The phosphor layer 12 is formed on the wheel substrate 11 and continuously in a circumferential direction in which the wheel substrate 11 rotates, as illustrated, for example, in FIG. 1. In other words, the phosphor layer 12 is formed, for example, into an annular shape.

The phosphor particle 121 includes, for example, a phosphor in a form of particle that absorbs excitation light EL applied from a light source section 110 to output fluorescent light FL1. For example, a fluorescent substance is used for the phosphor particles 121. The fluorescent substance is excited by blue laser light having a wavelength falling in a blue wavelength range (for example, from 400 nm to 470 nm) to output yellow fluorescent light (light in a wavelength range from a red wavelength range to a green wavelength range). Such a fluorescent substance includes, for example, a YAG (yttrium-aluminum-garnet)-based material. The average particle size of the phosphor particles 121 is, for example, not less than 5 μm and not more than 40 μm. It is preferable that the phosphor layer 12 have a thickness equal to the thickness of one or two layers of stacked phosphor particles 121 as illustrated, for example, in FIG. 3 and the like. Specifically, it is preferable that the phosphor layer 12 have a thickness, for example, of not less than 40 μm and not more than 200 μm.

For example, the cover glass 13 has an annular shape, and has an opening 13H at the middle thereof. The cover glass 13 is provided to hold, on the wheel substrate 11, the phosphor particles 121 that configure the phosphor layer 12. The cover glass 13 includes a material having a light transmissive property. The cover glass 13 has a property that allows the excitation light EL and the fluorescent light FL converted by the phosphor particles to pass through. The material of the cover glass 13 includes, for example, quartz, glass, sapphire, crystal, and the like. Of these materials, it is preferable to use sapphire having a high thermal conductivity. In addition, in a case where a light source having a low output is used for the light source unit 100, which will be described later, it is possible to use a resin material such as polyethylene terephthalate (PET) or silicone resin.

The cover glass 13 according to the present embodiment has the recessed portion 13A that forms the space X1 and is provided in the surface thereof opposed to the wheel substrate 11 as described above. The recessed portion 13A has a side surface 13S2 on the outer peripheral side of the cover glass 13, and has an inner peripheral side communicating with the outside. It is preferable that the recessed portion 13A have a height (depth) h equal, for example, to a thickness that allows one or two layers of phosphor particles 121 to be stacked. Specifically, it is preferable that the recessed portion 13A have a thickness, for example, of not less than 40 μm and not more than 200 μm. In addition, the cover glass 13 includes a plurality of protruding portions 13B extending from an end portion thereof on the inner peripheral side toward the outer peripheral side. The phosphor particles 121 are charged into the space X1 from between the plurality of protruding portions 13B with centrifugal force.

The plurality of protruding portions 13B forms a charging port used to charge the phosphor particles 121 into the space X1, and also used to prevent the phosphor particles 121 that have been charged into the space X1 from moving to the outside. In addition, the protruding portion 13B is provided to function as a supporting portion used to maintain the space X1 on the inner peripheral portion side of the cover glass 13. In other words, the cover glass 13 has a cross-sectional shape in which the inner peripheral side and the outer peripheral side have side surfaces 13S1 and 13S2, respectively, to form a trench shape at portions where the plurality of protruding portions 13B is formed. This trench portion forms an annular portion of the phosphor layer 12 in a planar view. In addition, the cross-sectional shape of the cover glass 13 has an L shape in which the side surface 13S2 is provided only on the outer peripheral side between the plurality of protruding portions 13B as illustrated in FIG. 5.

Figure 6:
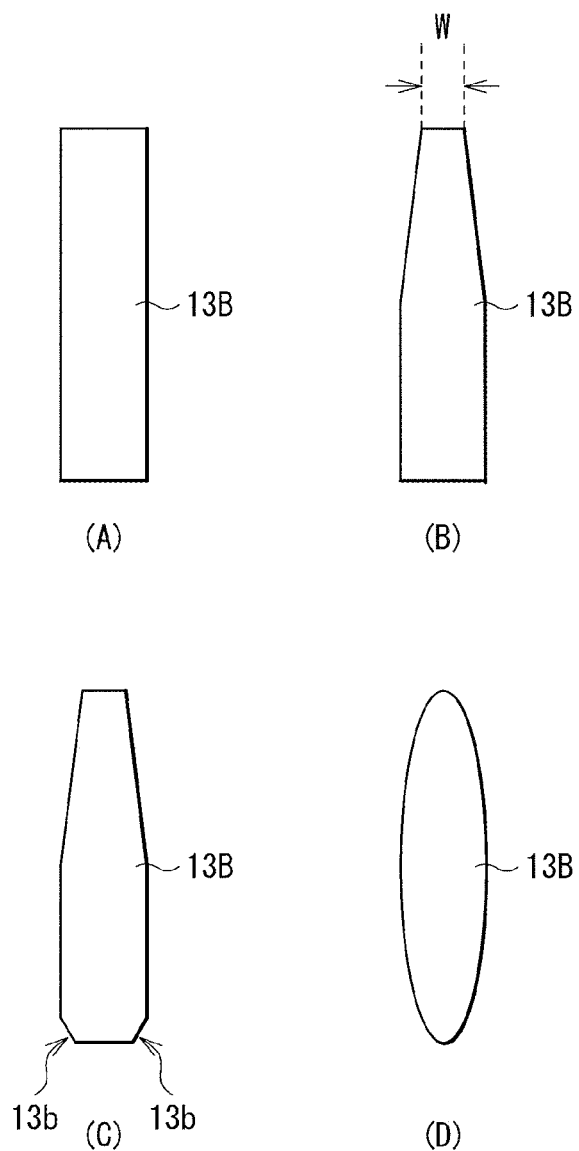
FIG. 6 is a schematic view of a planar shape of a protruding portion illustrated in FIG. 1.

The planar shape of the plurality of protruding portions 13B may have a rectangular shape having, for example, long sides extending from the inner peripheral portion toward the outer peripheral portion as illustrated in FIG. 6(A). However, it is preferable that a tip portion of the protruding portion 13B has a width decreasing from the inner peripheral portion side toward the outer peripheral portion side as illustrated in FIGS. 1 and 6(B). It is preferable that the width w of the tip portion is set, for example, to be approximately equal to or less than the average particle size of the phosphor particles 121. Specifically, the width w is preferably set to be, for example, equal to or less than 2 mm. This reduces a region where it is difficult to provide the phosphor particles 121 within the space X1. In addition, the plurality of protruding portions 13B may have a beveled portion 13b at the end surface thereof on the inner peripheral portion side as illustrated in FIG. 6(C). This makes it easy to charge the phosphor particles 121 into the space X1 with centrifugal force. In addition, the plurality of protruding portions 13B may have an oval shape having the major axis extending from the inner peripheral portion toward the outer peripheral portion as illustrated in FIG. 6(D).

Furthermore, the cover glass 13 has a groove portion 13C to be filled with an adhesive 14 that allows the wheel substrate 11 and the cover glass 13 to adhere to each other. It is preferable that the groove portion 13C be formed on the inner peripheral portion or the outer peripheral portion of the cover glass 13 or both. In addition, it is preferable that the groove portion 13C be separated from the space X1 where the phosphor layer 12 is fouled. Therefore, it is preferable that the groove portion 13C at the inner peripheral portion be provided, for example, on the inner side of some protruding portions 13B of the plurality of protruding portions 13B, as illustrated in FIGS. 1, 3, and 4 (groove portion 13Ca). With the groove portion 13Ca being formed on the inner side of the protruding portion 13B, a space X2 is formed separately from the space X1. It is preferable that the groove portion 13C at the outer peripheral portion be provided, for example, at the outer edge of the outer peripheral portion of the cover glass 13 that configures the side surface 13S2 of the recessed portion 13A, as illustrated in FIGS. 1 and 4 (groove portion 13Cb). This alleviates transfer, to the adhesive 14, of heat generated in the phosphor layer 12 due to irradiation with the excitation light EL, reducing occurrence of outgas. Note that, in FIG. 1, the protruding portion 13B that includes the groove portion 13Ca therein is illustrated to have a shape larger than that of other protruding portions 13B. However, the shape is not limited to this. The protruding portion 13B that includes the groove portion 13Ca therein may have the same shape as those of the other protruding portions. In addition, the groove portion 13Ca does not necessarily have to be formed in the protruding portion 13B. A structure portion that is able to accommodate the adhesive 14 may be formed separately.

Furthermore, the cover glass 13 has an air hole 13D that is provided, for example, at the outer peripheral portion and allows the space X to communicate to the outside. The air hole 13D is provided to discharge harmful gas such as air or outgas warmed with heat generated in the phosphor layer 12, from the inside of the space X1 to the outside. This makes it possible to prevent temperatures within the space X1 from increasing or prevent the space X1 from being filled with harmful gas. It is desirable that the hole diameter of the air hole 13D have a size that does not allow the phosphor particle 121 to pass through. For example, it is desirable that the hole diameter be equal to or less than 50% of the average particle size of the phosphor particle 121.

The structure described above is able to be formed integrally, for example, through molding of the cover glass 13. This makes it possible to accurately form structures of individual parts.

The motor 15 is provided to drive the phosphor wheel 1 to rotate at a predetermined rotational speed. The motor 15 so drives the phosphor wheel 1 that the phosphor layer 12 rotates in a surface perpendicular to a direction of emission of the excitation light EL emitted from the light source section 110, which will be described later. Thereby, an irradiated position of the phosphor wheel 1 with the excitation light EL temporally varies (moves) in a surface perpendicular to the direction of emission of the excitation light EL at a speed corresponding to the rotational speed.

It should be noted that the phosphor wheel 1 according to the present embodiment may include a member other than those described above. For example, the phosphor wheel 1 may include a reflecting layer formed on surface S1 side of the wheel substrate 11. In addition to a dielectric multilayer, it is possible to form the reflecting layer using, for example, a metal film containing a metallic element such as aluminum (Al), silver (Ag), or titanium (Ti), or the like. The reflecting layer reflects the excitation light EL emitted from the light source section 110, the fluorescent light FL converted in the phosphor layer 12, or the like and functions to enhance efficiency in outputting light in the phosphor wheel 1. With the reflecting layer being provided, it is possible to use a material that does not have a light reflective property for the wheel substrate 11. Such a material includes a crystalline material such as a simple substance of Si, SiC, diamond, or sapphire, and also includes other materials having a light transmissive property such as quartz or glass. In addition, a thin optical film may be provided on a surface of the cover glass 13, or between the phosphor layer 12 and the cover glass 13, the specific example of which will be described later.

(1-2. Configuration of Light Source Unit)

Figure 7:
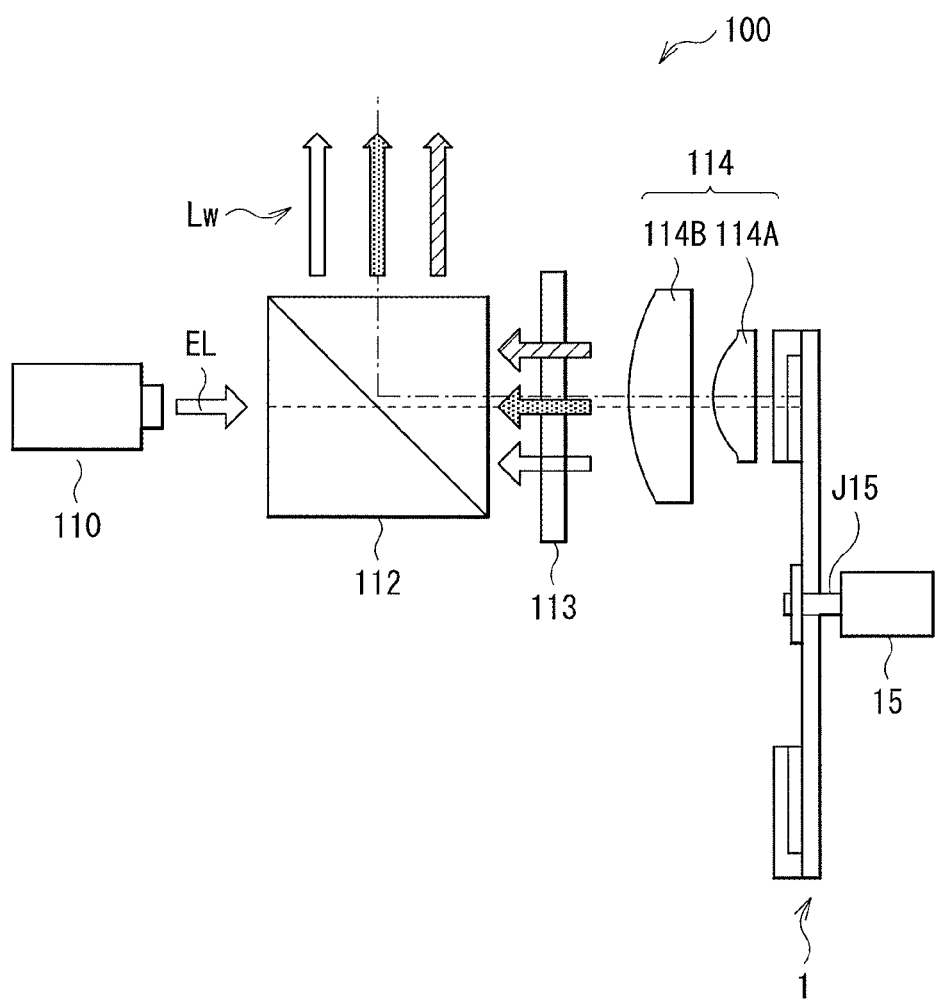
FIG. 7 is a schematic view of a configuration example of a light source unit having the phosphor wheel illustrated in FIG. 1.

FIG. 7 is a schematic view of an overall configuration of the light source unit 100 including the phosphor wheel 1 according to the present embodiment. The light source unit 100 includes the phosphor wheel 1, the light source section 110, a polarized beam splitter (PBS) 112, a quarter-wave retarder 113, and a condensing optical system 114. The phosphor wheel 1 includes, for example, a reflective wavelength conversion device. The phosphor wheel 1 is supported by the shaft J15 in a rotatable manner. Each of the members that configure the light source unit 100 are disposed on an optical path of light (combined light Lw) outputted from the phosphor wheel 1 in an order of the condensing optical system 114, the quarter-wave retarder 113, and the PBS 112 from the phosphor wheel 1 side. The light source section 110 is disposed at a position where the light source section 110 is opposed to one light entering surface of the PBS 112 and in a direction perpendicular to the optical path of the combined light Lw.

The light source section 110 includes a solid-state light-emitting element that emits light with a predetermined wavelength. In the present embodiment, a semiconductor laser device that oscillates the excitation light EL (for example, blue laser light with a wavelength of 445 nm or 455 nm) is used as the solid-state light-emitting element. The excitation light EL of linearly-polarized light (s-polarization) is outputted from the light source section 110~.

It should be noted that, in a case where the light source section 110 is configured with the semiconductor laser device, the light source section 110 may be configured such that excitation light EL with a predetermined output is obtained using one semiconductor laser device, or may be configured such that outputted light rays from a plurality of semiconductor laser devices are combined to obtain excitation light EL with a predetermined output. In addition, the wavelength of the excitation light EL is not limited to the numerical values described above. The excitation light EL may have any wavelength that falls in a wavelength range of light called blue light.

The PBS 112 is provided to separate the excitation light EL inputted from the light source section 110 and the combined light Lw inputted from the phosphor wheel 1. Specifically, the PBS 112 is provided to reflect the excitation light EL inputted from the light source section 110 toward the quarter-wave retarder 113. In addition, the PBS 112 transmits the combined light Lw passing from the phosphor wheel 1 through the condensing optical system 114 and the quarter-wave retarder 113 and entering the PBS 112. The transmitted combined light Lw enters an illumination optical system 200 (which will be described later).

The quarter-wave retarder 113 is a retarding element that causes a phase difference of $\pi/2$ with respect to inputted light. In a case where the inputted light is linearly-polarized light, the linearly-polarized light is converted into circularly-polarized light. In a case where the inputted light is circularly-polarized light, the circularly-polarized light is converted into linearly-polarized light. In the present embodiment, the excitation light EL of linearly-polarized light outputted from the polarized beam splitter 112 is converted by the quarter-wave retarder 113 into the excitation light EL of circularly-polarized light. In addition, an excitation light component of circularly-polarized light contained in the combined light Lw outputted from the phosphor wheel 1 is converted by the quarter-wave retarder 113 into linearly-polarized light.

The condensing optical system 114 is provided to gather, in a predetermined spot diameter, the excitation light EL outputted from the quarter-wave retarder 113, and output the gathered excitation light EL toward the phosphor wheel 1. In addition, the condensing optical system 114 is provided to convert the combined light Lw outputted from the phosphor wheel 1 into parallel light to output the parallel light toward the quarter-wave retarder 113. Note that the condensing optical system 114 may be configured such that the inputted light is converted into the parallel light, for example, using a plurality of lenses (for example, two lenses 114A and 114B), or may be configured, for example, with one collimating lens.

It should be noted that the configuration of the optical members that separate the excitation light EL inputted from the light source section 110 and the combined light Lw outputted from the phosphor wheel 1 is not limited to the PBS 112. It is possible to use any optical member having a configuration that is able to achieve the light separating operation described above. In addition, a cooling fan may be provided within the light source unit 100 to cool the heat of the phosphor layer 12 generated in association with irradiation with the excitation light EL.

(1-3. Configuration of Projector)

Figure 8:
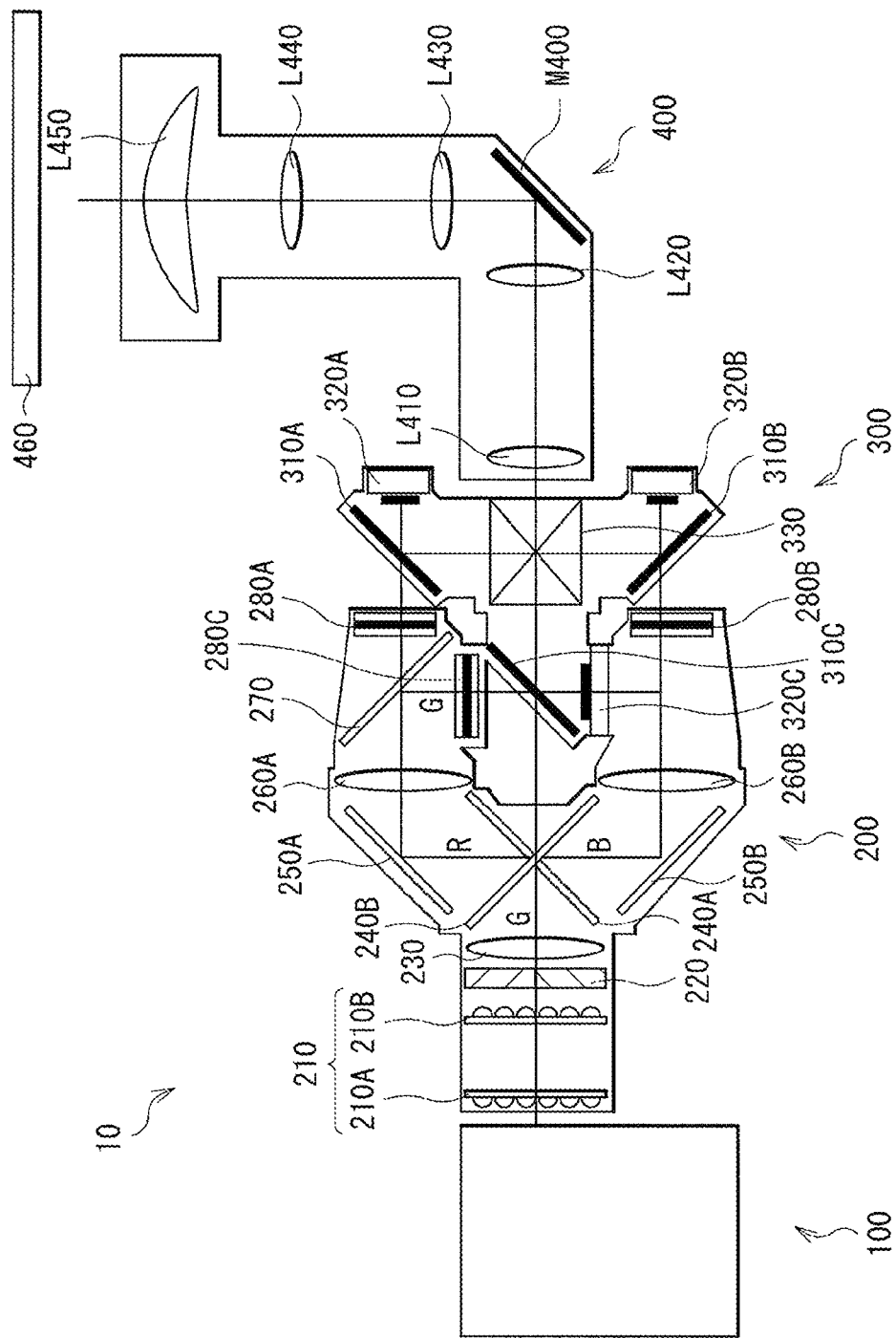
FIG. 8 is a schematic view of a configuration example of a projector having the light source unit illustrated in FIG. 7.

Next, a projection-type display apparatus (projector 10) according to the present disclosure will be described. FIG. 8 is a schematic view of an overall configuration of the projector 10 including the light source unit 100 illustrated in FIG. 7 as a light-source optical system. Note that, in the following description, a reflective 3LCD-type projector that performs light modulation using a reflective liquid crystal panel (LCD) is given as an example. Note that, instead of the reflective liquid crystal panel, the phosphor wheel 1 is also applicable to a projector using a transmissive liquid crystal panel, a digital micro-mirror device (DMD), or the like.

As illustrated in FIG. 8, the projector 10 includes the light source unit 100 described above, the illumination optical system 200, an image forming unit 300, and a projecting optical system 400 (projection optical system) in order.

The illumination optical system 200 includes, for example, fly eye lenses 210 (210A, 210B), a polarization conversion element 220, a lens 230, dichroic mirrors 240A and 240B, reflecting mirrors 250A and 250B, lenses 260A and 260B, a dichroic mirror 270, and polarizing plates 280A to 280C, from a position closer to the light source unit 100.

The fly eye lenses 210 (210A and 210B) are provided to achieve uniform distribution of illumination of white light from the light source unit 100. The polarization conversion element 220 is provided so as to align a polarization axis of inputted light in a predetermined direction. For example, light other than p-polarization light is converted into p-polarization light. The lens 230 gathers light from the polarization conversion element 220 toward the dichroic mirrors 240A and 240B. The dichroic mirrors 240A and 240B are provided to selectively reflect light in a predetermined wavelength range, and selectively transmit light in other wavelength ranges. For example, the dichroic mirror 240A primarily reflects red light toward a direction of the reflecting mirror 250A. In addition, the dichroic mirror 240B primarily reflects blue light toward a direction of the reflecting mirror 250B. Accordingly, green light primarily passes through both of the dichroic mirrors 240A and 240B, and travels toward a reflective polarizing plate 3100 (described later) of the image forming unit 300. The reflecting mirror 250A reflects light (primarily, red light) from the dichroic mirror 240A toward the lens 260A. The reflecting mirror 250B reflects light (primarily, blue light) from the dichroic mirror 240B toward the lens 260B. The lens 260A allows light (primarily, red light) from the reflecting mirror 250A to pass through, and gathers the light to the dichroic mirror 270. The lens 260B allows light (primarily, blue light) from the reflecting mirror 250B to pass through, and gathers the light to the dichroic mirror 270. The dichroic mirror 270 is provided to selectively reflect green light and selectively transmit light in the other wavelength ranges. Here, the dichroic mirror 270 allows a red light component of light from the lens 260A to pass through. In a case where the light from the lens 260A contains a green light component, the green light component is reflected toward the polarizing plate 280C. The polarizing plates 280A to 280C contain a polarizer having a polarization axis in a predetermined direction. For example, in a case where conversion is performed into p-polarization light in the polarization conversion element 220, the polarizing plates 280A to 280C allow light of p-polarization to pass through, and reflect light of s-polarization.

The image forming unit 300 includes reflective polarizing plates 310A to 310C, reflective liquid crystal panels 320A to 320C (optical modulation elements), and a dichroic prism 330.

The reflective polarizing plates 310A to 310C are each provided to transmit light (for example, p-polarization light) having the same polarization axis as the polarization axis of the polarized light from each of the polarizing plates 280A to 280C, and reflect light (s-polarization light) having other polarization axes. Specifically, the reflective polarizing plate 310A allows red light of p-polarization from the polarizing plate 280A to pass through toward the reflective liquid crystal panel 320A. The reflective polarizing plate 310B allows blue light of p-polarization from the polarizing plate 280B to pass through toward the reflective liquid crystal panel 320B. The reflective polarizing plate 310C allows green light of p-polarization from the polarizing plate 280C to pass through toward the reflective liquid crystal panel 320C. Further, the green light of p-polarization that has passed through both of the dichroic mirrors 240A and 240B and entered the reflective polarizing plate 310C directly passes through the reflective polarizing plate 310C, and enters the dichroic prism 330. Furthermore, the reflective polarizing plate 310A reflects red light of s-polarization from the reflective liquid crystal panel 320A, and causes it to enter the dichroic prism 330. The reflective polarizing plate 310B reflects blue light of s-polarization from the reflective liquid crystal panel 320B, and causes it to enter the dichroic prism 330. The reflective polarizing plate 310C reflects green light of s-polarization from the reflective liquid crystal panel 320C, and causes it to enter the dichroic prism 330.

The reflective liquid crystal panels 320A to 320C each perform spatial modulation of red light, blue light, or green light.

The dichroic prism 330 is provided to combine the red light, the blue light, and the green light inputted therein, and output it toward the projecting optical system 400.

The projecting optical system 400 includes lenses L410 to L450 and a mirror M400. The projecting optical system 400 enlarges light outputted from the image forming unit 300 to project it onto the screen 460 or the like.

(Operation of Light Source Unit and Projector)

Next, operations of the projector 10 including the light source unit 100 will be described with reference to FIGS. 7 and 8.

First, in the light source unit 100, the motor 15 drives to cause the phosphor wheel 1 to rotate. After this, excitation light EL is oscillated from the light source section 110 toward the PBS. The excitation light EL is reflected by the PBS 112, and then, passes through the quarter-wave retarder 113 and the condensing optical system 114 in this order to applied to the phosphor wheel 1.

In the phosphor wheel 1, a portion of the excitation light EL (blue light) is absorbed at the phosphor layer 12, and is converted into light (fluorescent light FL; yellow light) in a predetermined wavelength range. A portion of the fluorescent light FL1 outputted from the phosphor layer 12 together with a portion of the excitation light EL that has not been absorbed at the phosphor layer 12 is diffused, and is reflected toward the condensing optical system 114 side. In a case where the wheel substrate 11 or reflecting layer is provided, the fluorescent light FL and the excitation light EL that have not been reflected at the phosphor layer 12 toward the condensing optical system 114 side are reflected by the reflecting layer toward the condensing optical system 114 side.

This results in combination of the fluorescent light FL1, the fluorescent light FL2, and a portion of the excitation light EL in the phosphor wheel 1 to generate white light. This white light (combined light Lw) is outputted toward the condensing optical system 114.

After this, the combined light Lw passes through the condensing optical system 114, the quarter-wave retarder 113, and the PBS 112, and is inputted into the illumination optical system 200.

The combined light Lw (white light) inputted from the light source unit 100 sequentially passes through the fly eye lenses 210 (210A and 210B), the polarization conversion element 220, and the lens 230, and reaches the dichroic mirrors 240A and 240B.

The dichroic mirror 240A primarily reflects red light. The red light sequentially passes through the reflecting mirror 250A, the lens 260A, the dichroic mirror 270, the polarizing plate 280A, and the reflective polarizing plate 310A, and reaches the reflective liquid crystal panel 320A. This red light is subjected to spatial modulation at the reflective liquid crystal panel 320A, is reflected on the reflective polarizing plate 310A, and enters the dichroic prism 330. Note that, in a case where light reflected by the dichroic mirror 240A toward the reflecting mirror 250A contains a green light component, the green light component is reflected by the dichroic mirror 270. This green light component sequentially passes through the polarizing plate 280C and the reflective polarizing plate 310C, and reaches the reflective liquid crystal panel 320C. The dichroic mirror 240B primarily reflects blue light. Through similar processes, the blue light enters the dichroic prism 330. The green light that has passed through the dichroic mirrors 240A and 240B also enters the dichroic prism 330.

The red light, the blue light, and the green light that enter the dichroic prism 330 are combined. Then, the combined light is outputted toward the projecting optical system 400 as image light. The projecting optical system 400 enlarges the image light from the image forming unit 300 to project it onto a screen 460 or the like.

(1-4. Workings and Effects)

As described above, laser phosphor light sources have been often used in recent years as a light source in a projector. In these laser phosphor light sources, while part of energy of excitation light entering the phosphor portion of the wavelength conversion device is converted into and employed as fluorescent light, the rest of the energy not employed as fluorescent light turns into heat. Therefore, the phosphor portion of the wavelength conversion device generates heat to be at a high temperature. The increase in temperature of the phosphor portion leads to a degradation of reliability of the phosphor portion such as a breakage or a reduction in lifetime, or leads to a reduction in light conversion efficiency. Therefore, it is preferable that the phosphor portion have high cooling performance. In addition, in a case of a typical wavelength conversion device (phosphor wheel), the phosphor portion is mixed with a binder, and is fixed on a wheel substrate. However, in order to improve the light conversion efficiency, the phosphor particles are demanded to have an increased packing fraction per unit volume.

From these viewpoints, a binderless phosphor wheel that does not use any binder is proposed. The binderless phosphor wheel has a space between the wheel substrate and the cover glass. The space is filled with phosphor particles. This makes it possible to form a phosphor portion having high phosphor density. Furthermore, the binderless phosphor wheel is able to dissipate heat from the cover glass side in addition to the wheel substrate. This also makes it possible for the phosphor portion to have higher cooling performance.

In a case of this binderless phosphor wheel, variation in thickness of the phosphor portion leads to variation in output of fluorescent light. Therefore, the phosphor portion is demanded to have a thickness adjusted in a highly precise manner. As for a method of adjusting a thickness of the phosphor portion in the binderless phosphor wheel, it is considered to employ a method of mixing a glass bead having a high accuracy in diameter, with an adhesive that allows the wheel substrate and the cover glass to adhere to each other. In addition, instead of the glass bead, it is considered to employ a method in which a spacer or the like having a high accuracy in thickness is disposed between the wheel substrate and the cover glass. In either case, given that phosphor particles are charged into a space between the wheel substrate and the cover glass with centrifugal force, an adhesive is used between the wheel substrate and the cover glass.

An adhesive generates outgas due to heat transferred from the phosphor portion generating heat due to irradiation with excitation light, which possibly degrades the phosphor particle. In addition, detachment of the wheel substrate and the cover glass may take place due to heat transferred from the phosphor portion. Thus, the adhesive may cause degradation of reliability.

Meanwhile, in the present embodiment, the recessed portion 13A is provided in a surface of the cover glass 13 that is opposed to the wheel substrate 11. In addition, the space X1 is provided between the wheel substrate 11 and the cover glass 13. Furthermore, the plurality of protruding portions 13B extending from the inner peripheral portion of the recessed portion 13A toward the outer peripheral portion thereof is provided within the recessed portion 13A. The phosphor particle 121 is charged into the space X1 from between the plurality of protruding portions 13B with centrifugal force, which forms the phosphor layer 12 between the wheel substrate 11 and the cover glass 13. This allows variation in thickness of the phosphor layer 12 to be reduced.

With the configuration described above, in a case of the light source unit 100 according to the present embodiment, the recessed portion 13A including the plurality of protruding portions 13B extending from the inner peripheral portion toward the outer peripheral portion is provided in the surface of the cover glass 13 that is opposed to the wheel substrate 11. The phosphor particle 121 is charged into the space X1 formed by the recessed portion 13A and the wheel substrate 11 to form the phosphor layer 12. Thereby, it is possible to reduce the variation in thickness of the phosphor layer 12, which makes it possible to improve the reliability.

Furthermore, in the present embodiment, the tip of each of the plurality of protruding portions 13B has a planar shape having the width decreasing from the inner peripheral portion toward the outer peripheral portion. This makes it possible to reduce a region within the space X1 where it is difficult to charge the phosphor particles 121, which makes it possible to form the phosphor layer 12 with the phosphor particles 121 having an increased packing fraction per unit volume. Therefore, it is possible to improve the light conversion efficiency.

Furthermore, in the present embodiment, the cover glass 13 has the groove portion 13C at a position thereof. The position is separated from the space X1 where the phosphor layer 12 is formed. The adhesive 14 is charged into this groove portion 13C to allow the wheel substrate 11 and the cover glass 13 to adhere to each other. Specifically, for example, the groove portion 13Ca is provided on the inner side of some protruding portions 13B of the plurality of protruding portions 13B, and forms the space X2 separately from the space X1. The adhesive 14 is charged into the space X2. In addition, the groove portion 13Cb is formed at the outer edge of the outer peripheral portion of the cover glass 13. This groove portion 13Cb is filled with the adhesive 14. With this configuration, it is possible to alleviate heat transferred to the adhesive 14. The heat is generated in the phosphor layer 12 due to irradiation with the excitation light EL. In addition, it is possible to reduce generation of outgas. Therefore, it is possible to reduce the degradation of the phosphor particle 121, which makes it possible to further improve the reliability.

Next, a second embodiment and modification examples 1 to 5 will be described. Below, the same reference characters are attached to constituent elements similar to those in the first embodiment described above, and explanation thereof will not be repeated as appropriate.

2. Second Embodiment

Figure 9:
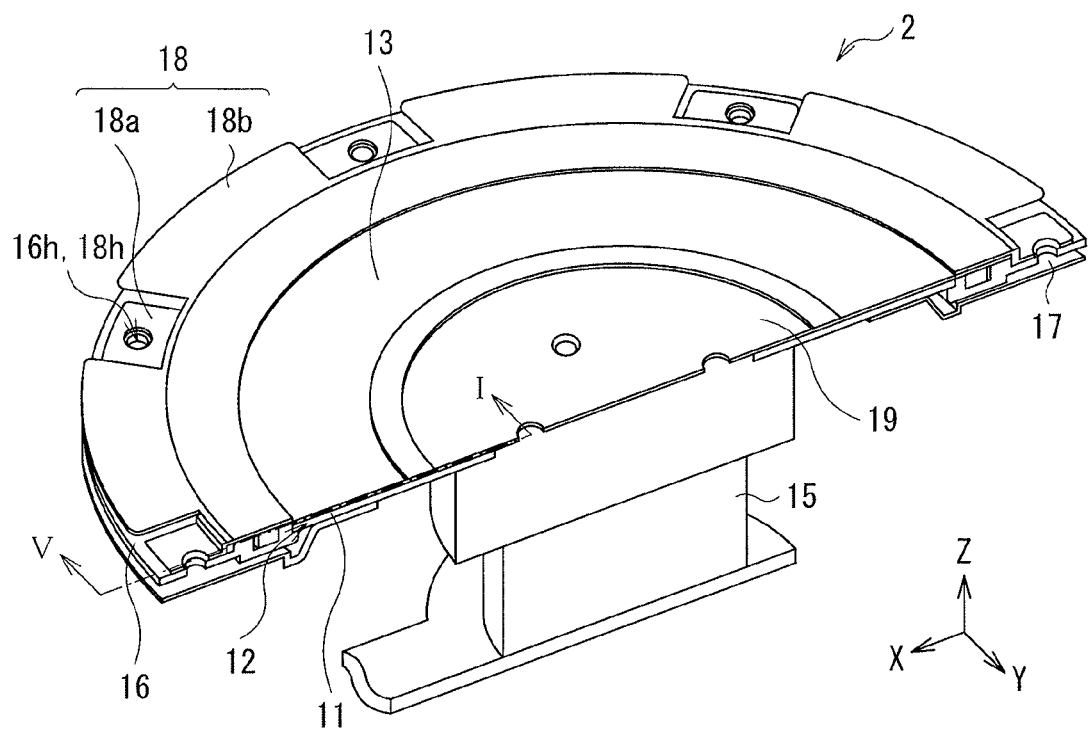
FIG. 9 is a cross-sectional perspective view of a configuration of a phosphor wheel according to a second embodiment of the present disclosure.
Figure 10:
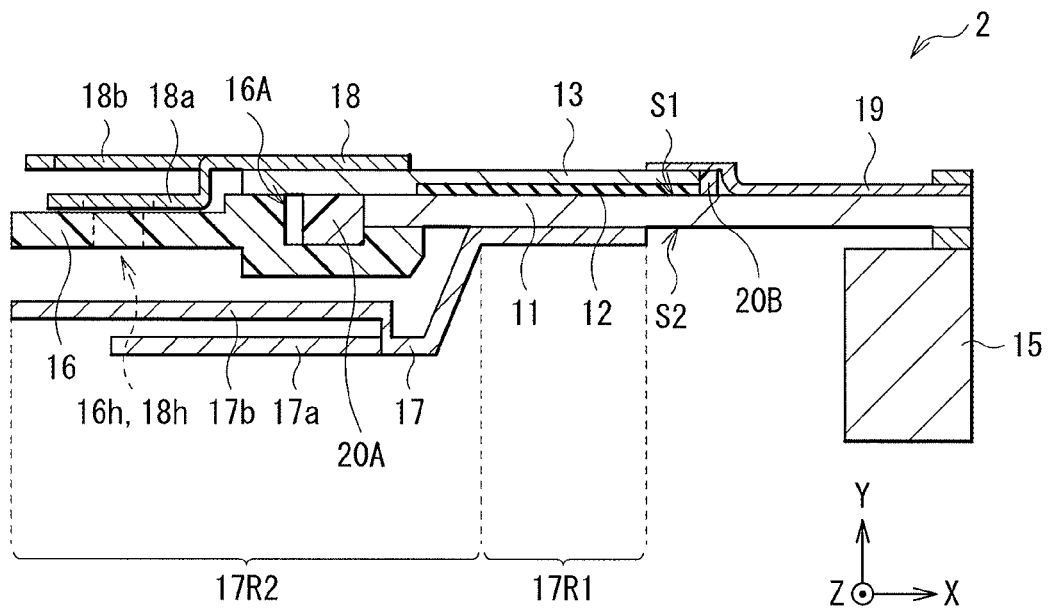
FIG. 10 is a cross-sectional schematic view taken along a line V-V of the phosphor wheel illustrated in FIG. 9.
Figure 11:
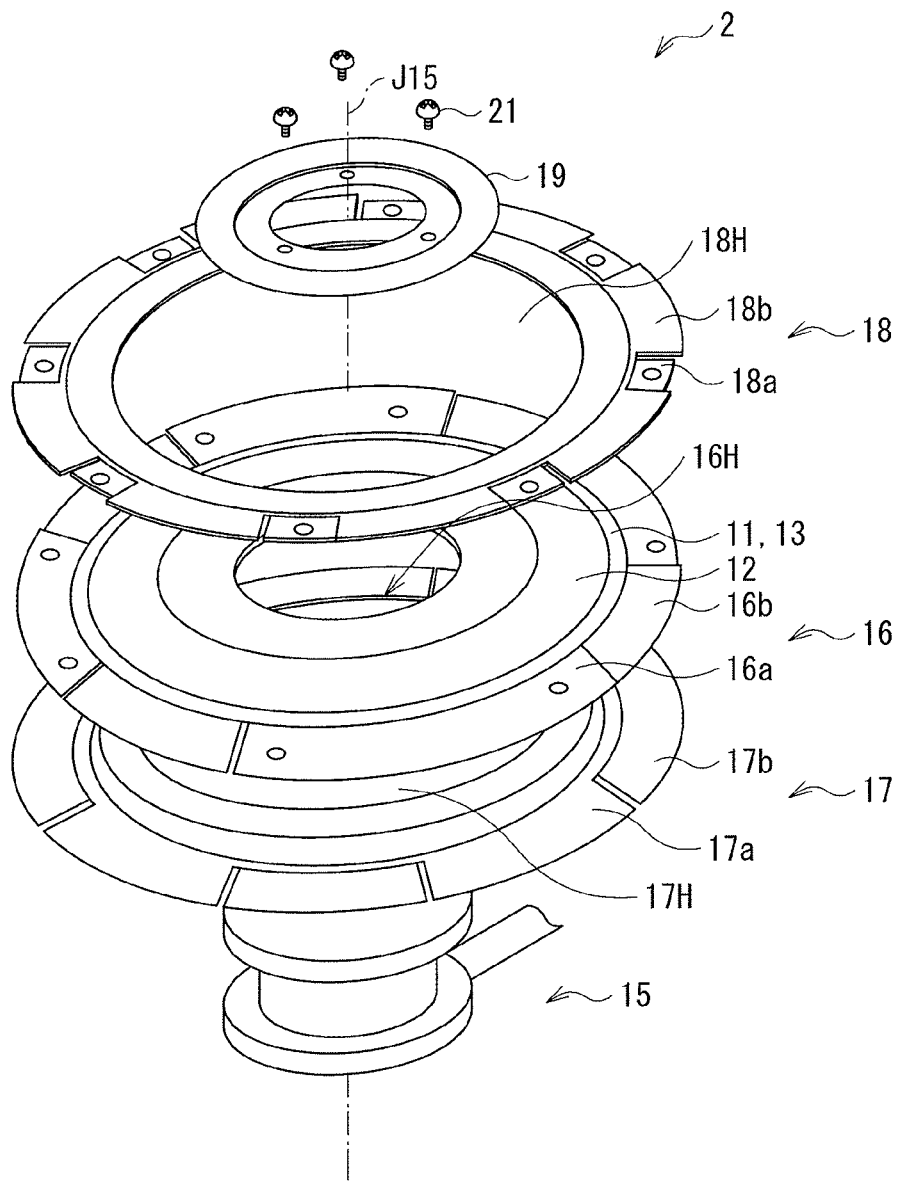
FIG. 11 is an exploded perspective view of the phosphor wheel illustrated in FIG. 9.

FIG. 9 is a perspective view of a cross-sectional configuration of a phosphor wheel 2 according to a second embodiment of the present disclosure. FIG. 10 is a schematic view of a cross-sectional configuration taken along a line V-V illustrated in FIG. 9. FIG. 11 is a perspective view in which each portion of the phosphor wheel 2 illustrated in FIG. 9 is exploded. This phosphor wheel 2 configures, for example, the light source unit (light source unit 100) of the projection-type display apparatus (projector 10) described above. The phosphor wheel 2 according to the present embodiment has a configuration in which the wheel substrate 11 and the cover glass 13 include heat-dissipating members (an outer spacer 16, a wheel heat sink 17, and a glass-holder heat sink 18). In addition, the present embodiment has a configuration in which the wheel substrate 11 and the cover glass 13 are fixed in a mechanical manner to control a thickness of the phosphor layer 12.

(2-1. Configuration of Phosphor Wheel)

The phosphor wheel 2 has a configuration in which the wheel substrate 11, the phosphor layer 12, and the cover glass 13 are stacked in this order, as with the phosphor wheel 2 according to the first embodiment described above. In the phosphor wheel 2 according to the present embodiment, the outer spacer 16 serving as a heat-dissipating member is fixed at the outer edge portion of the wheel substrate 11. In addition, the wheel heat sink 17 is disposed at the peripheral edge portion of the wheel substrate 11 on the back surface (surface S2) side. The glass-holder heat sink 18 is disposed at the peripheral edge portion of the cover glass 13 on the front surface (surface S1) side. The wheel substrate 11 and the cover glass 13 are fixed to the motor 15, for example, with an inner plate 19 using a screw 21, and are able to rotate about the shaft J15.

The outer spacer 16 has a disk shape (specifically, an annular shape) having an opening 16H at the middle thereof as illustrated, for example, in FIG. 11. In addition, the outer spacer 16 also functions as a heat-dissipating member that dissipates heat due to stokes loss occurring when the phosphor particle 121 absorbs the excitation light EL1 to output the fluorescent light FL. Furthermore, the outer spacer 16 is fixed at the outer edge portion of the wheel substrate 11, and is provided to control a 12 thickness of the phosphor layer. The outer spacer 16 has a groove 16A for a gasket 20A that seals the side surface of the outer peripheral side of the phosphor layer 12. It is preferable that the outer spacer 16 include a material having high thermal conductivity. Specifically, it is desirable that the outer spacer 16 includes a pure-aluminum-based material.

The peripheral edge portion of the outer spacer 16 includes a plurality of fins as illustrated in FIG. 11. The plurality of fins is disposed along the peripheral edge portion of the outer spacer 16 so as to be spaced apart from each other, and is provided by making some slits at the peripheral edge portion. The plurality of fins includes, for example, two types of fins (a fin 16a and a fin 16b). The fin 16a and the fin 16b are alternately disposed at the peripheral edge portion of the outer spacer 16. Of these fins, the fin 16a is used as a fixing portion used to fix the glass-holder heat sink 18 that will be described later. As described above, with the plurality of fins spaced apart from each other being provided at the peripheral edge portion of the outer spacer 16, heat dissipating efficiency of the phosphor layer 12 through the outer spacer 16 improves.

Furthermore, it is preferable that a height difference exist between the fin 16a and the fin 16b. In the present embodiment, for example, the fin 16a is formed in the same plane as the inner peripheral portion of the outer spacer 16 whereas, for example, the fin 16b has a base portion folded, for example, toward the wheel heat sink 17 side (surface S2 side), to form a plane closer to the wheel heat sink 17 than the fin 16a. This breaks a temperature boundary layer within the plane of the outer spacer 16, which further improves the heat dissipating efficiency of the phosphor layer 12 through the outer spacer 16. In addition, the outer spacer 16 may be formed such that each of the fins 16b is divided into a plurality of pieces, and a height difference exists between adjacent fins 16b.

The wheel heat sink 17 is provided to dissipate, from the wheel substrate 11 side, heat resulting from stoke loss occurring when the phosphor particle 121 absorbs the excitation light EL to output the fluorescent light FL, as with the outer spacer 16. It is preferable that the wheel heat sink 17 include a material having high thermal conductivity. For example, it is desirable that the wheel heat sink 17 include a pure-aluminum-based material, as with the outer spacer 16.

The wheel heat sink 17 has a disk shape (specifically, an annular shape) having an opening 17H at the middle thereof as illustrated, for example, in FIG. 11. The wheel heat sink 17 includes an inner peripheral portion 17R1 that is in contact with a back surface (surface S2) of the wheel substrate 11, and a peripheral edge portion 17R2 that forms a surface at a position spaced apart from the back surface of the wheel substrate 11, as illustrated in FIG. 10. The peripheral edge portion 17R2 includes a plurality of fins. The plurality of fins includes, for example, two types of fins (a fin 17a and a fin 17b). It is preferable that these fins be disposed alternately as with the plurality of fins 16a and 16b provided on the outer spacer 16, and a height difference exist between these fins. Specifically, for example, the fin 17b is formed in the same plane as the peripheral edge portion 17R2 of the wheel heat sink 17. The fin 17a has a base portion folded, for example, so as to be away from the outer spacer 16 to form a plane at a position farther away from the outer spacer 16 than the surface where the fin 17b is formed. This breaks a temperature boundary layer within the plane of the peripheral edge portion 17R2 of the wheel heat sink 17, which improves the heat dissipating efficiency of the phosphor layer 12 through the wheel heat sink 17.

The glass-holder heat sink 18 is provided to dissipate, from the cover glass 13 side, heat generated when the phosphor particle 121 absorbs the excitation light EL to output the fluorescent light FL. Therefore, it is preferable that the glass-holder heat sink 18 include a material having high thermal conductivity. In addition, the glass-holder heat sink 18 is provided to fix the cover glass 13 and continuously apply pressure to a gasket 18A to prevent the phosphor particle 121 from leaking from a space formed by the wheel substrate 11, the cover glass 13, and a pair of gaskets 18A and 18B. Therefore, it is preferable that the glass-holder heat sink 18 be configured using a spring member. As such a material includes, for example, beryllium copper can be mentioned.

The glass-holder heat sink 18 has a disk shape (specifically, an annular shape) having an opening 18H at the middle thereof as illustrated, for example, in FIG. 11. The peripheral edge portion of the glass-holder heat sink 18 includes a plurality of fins provided so as to be spaced apart from each other. The plurality of fins includes, for example, two types of fins (a fin 18a and a fin 18b) that are alternately disposed. Of these fins, the fin 18a is used as a fixing portion used to fix the glass-holder heat sink 18 to the outer spacer 16.

It is preferable that a height difference exist between the fin 18a and the fin 18b. For example, the fin 18a has a base folded, for example, toward the outer spacer 16 side to form a plane disposed closer to the outer spacer 16 than the plane of the glass-holder heat sink 18. The fin 18b is formed in the same plane as the inner peripheral portion of the glass-holder heat sink 18. As described above, the plurality of fins is provided so as to be spaced apart from each other at the peripheral edge portion of the glass-holder heat sink 18. In addition, a height difference exists between the fins. This breaks a temperature boundary layer within the plane of the glass-holder heat sink 18, which improves the heat dissipating efficiency of the phosphor layer 12 through the glass-holder heat sink 18. Note that the fin 16a and the fin 18a include openings 16h and 18h provided at positions that are opposed to each other, and are integrated with each other using, for example, a screw (not illustrated).

The inner plate 19 is provided to fix the phosphor wheel 2 to the motor 15. In addition, the inner plate 19 is provided to continuously apply pressure to the gasket 18B to prevent the phosphor particle 121 from leaking from the space formed by the wheel substrate 11, the cover glass 13, and the pair of gaskets 18A and 18B. It is preferable that the inner plate 19 be configured using a spring member, as with the glass-holder heat sink 18. In addition, it is preferable that the inner plate 19 have a high thermal conductive property. As such a material, for example, beryllium copper can be mentioned.

Gaskets 20A and 20B are provided to seal the phosphor particle 121 between the wheel substrate 11 and the cover glass 13 as described above, and also to maintain a space between the wheel substrate 11 and the cover glass 13. It is preferable that the gaskets 20A and 20B have a heat resistance property. In addition, it is preferable to use, for example, a silicon-based gasket.

It should be noted that FIGS. 9 to 11 give an example in which the outer spacer 16, the wheel heat sink 17, and the glass-holder heat sink 18 include two types of fins (fins 16a, 16b, 17a, 17b, 18a, and 18b) disposed so as to be spaced apart from each other along the peripheral edge portions thereof. However, this is non-limiting. For example, as illustrated in FIG. 9, two types of fins 16a and 16b spaced apart from each other at the peripheral edge portion may be provided only on the outer spacer 16, and the wheel heat sink 17 and the glass-holder heat sink 18 may simply have an annular shape. In addition, the plurality of fins does not necessarily have to be provided at the peripheral edge portion of the outer spacer 16. For example, it may be possible to employ a configuration in which the outer spacer 16 simply has an annular shape, and the wheel heat sink 17 and the glass-holder heat sink 18 include two types of fins 17a, 17b, 18a, and 18b spaced apart from each other at the peripheral edge portion. As described above, with the plurality of fins being provided at the peripheral edge portion of one or more heat-dissipating members that configure the phosphor wheel 2, the heat-dissipating performance of this heat-dissipating member is improved, which improves the heat dissipating efficiency of the phosphor layer 12.

Furthermore, the present embodiment gives an example in which fins having two types of heights are alternately disposed on each of the outer spacer 16, the wheel heat sink 17, and the glass-holder heat sink 18. However, fins having three or more types of heights may be provided.

(2-2. Workings and Effects)

In the phosphor wheel 2 according to the present embodiment, the outer spacer 16 and the wheel heat sink 17 serving as a heat-dissipating member are disposed at the outer edge portion and on the back surface (surface S2) of the wheel substrate 11, respectively. In addition, the glass-holder heat sink 18 serving as a heat-dissipating member is disposed on the surface and at the peripheral edge of the cover glass 13. Furthermore, these heat-dissipating members include the plurality of fins (fins 16a and 16b, fins 17a and 17b, and fins 18a and 18b) provided along the peripheral edge portion. This makes it possible to improve heat dissipating efficiency for heat generated at the time of absorbing the excitation light EL to output the fluorescent light FL, which makes it possible to improve cooling efficiency of the phosphor layer 12.

As described above, according to the present embodiment, the cooling efficiency of the phosphor layer 12 improves, and thermal quenching of the phosphor is reduced. Therefore, in addition to the effect obtained with the first embodiment described above, it is possible for the phosphor wheel 2 according to the present embodiment to provide an effect that allows luminance of the light source unit 100 to improve.

Furthermore, as described above, in a binderless phosphor wheel using an adhesive between the wheel substrate and a cover glass, there is a possibility that outgas is generated from the adhesive due to heat transferred from the phosphor portion that generates heat through irradiation with the excitation light, which degrades the phosphor particle 121. In addition, there is a possibility that detachment occurs between the wheel substrate and the cover glass due to heat transferred from the phosphor portion. Thus, reliability may be reduced. Moreover, in the binderless phosphor wheel using an adhesive between the wheel substrate and the cover glass, the number of steps increases in manufacturing steps, which includes a step of applying the adhesive or a step of adhering. This may increase manufacturing cost.

In contrast, in the present embodiment, the wheel substrate 11 and the cover glass 13 are fixed in a mechanical manner. Specifically, a spring member is used as a material that configures the glass-holder heat sink 18 and the inner plate 19. In addition, the gaskets 20A and 20B are disposed at the inner peripheral portion and the outer peripheral portion of the phosphor wheel 2 to seal the phosphor particle 121121 between the wheel substrate 11 and the cover glass 13 and maintain a constant space between the wheel substrate 11 and the cover glass 13.

As described above, in the phosphor wheel 2 according to the present embodiment, it is possible to fix the wheel substrate 11 and the cover glass 13 to each other without using any adhesive, which makes it possible to improve the reliability. Furthermore, the step of applying an adhesive, the step of adhering, or the like is reduced. Therefore, it is possible to provide an effect of reducing manufacturing cost, in addition to improvement of the reliability.

3. Modification Examples

3-1. Modification Example 1

Figure 12:
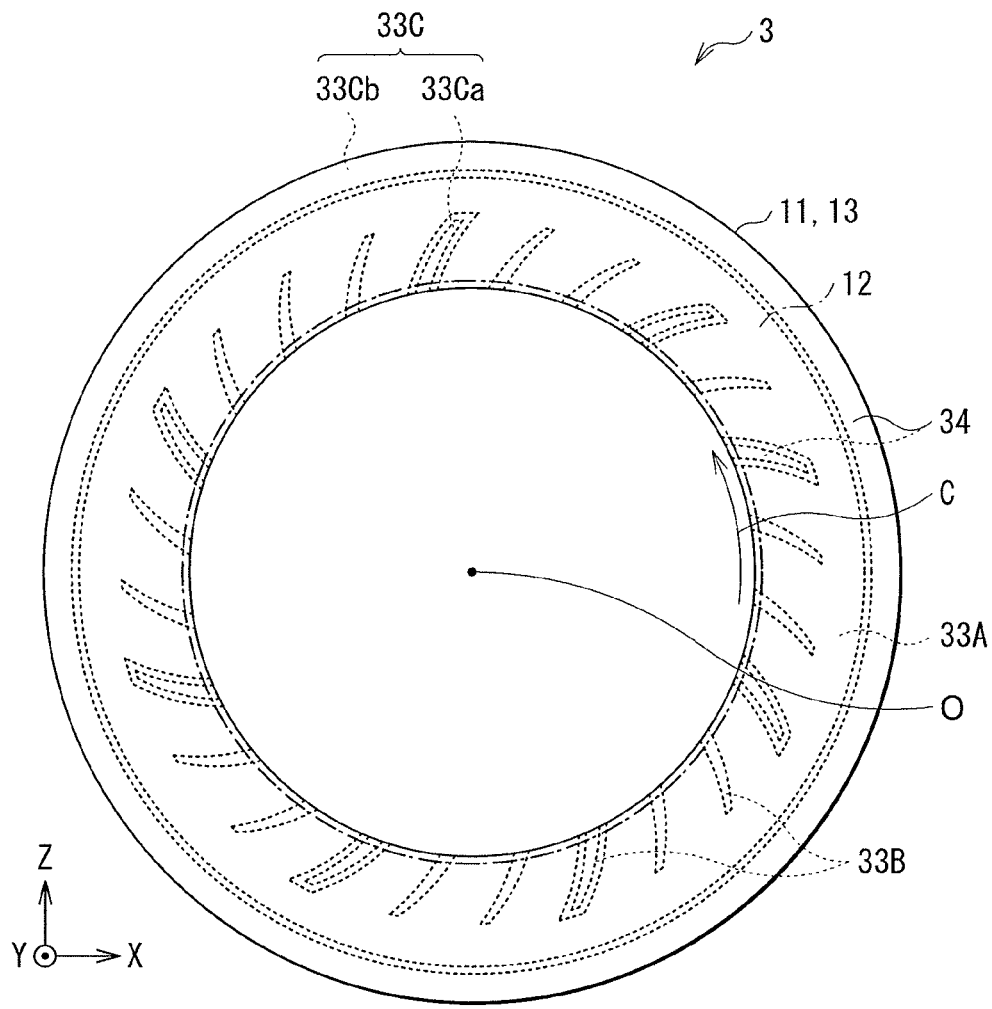
FIG. 12 is a planar schematic view of a configuration of a phosphor wheel according to modification example 1 of the present disclosure.

FIG. 12 is a schematic view of a planar configuration of a phosphor wheel 3 according to modification example 1 of the present disclosure. The phosphor wheel 3 according to the present modification example differs from the first embodiment described above in that a recessed portion 33A is formed in a surface, opposed to the wheel substrate 11, of a cover glass 33, and a plurality of protruding portions 33B extending in a spiral manner from an inner peripheral portion toward an outer peripheral portion is provided in the recessed portion 33A.

As described above, the cover glass 33 has a configuration in which the recessed portion 33A is provided on the surface, of the cover glass 33, opposed to the wheel substrate 11, and the recessed portion 33A includes therein the plurality of protruding portions 33B extending in a spiral manner from the inner peripheral portion to the outer peripheral portion. It is preferable that the rotational direction of this spiral from the center portion toward the peripheral edge portion be a direction opposite to the rotational direction C of the phosphor wheel 3 as illustrated in FIG. 12. In addition, it is preferable that the planar shape of the plurality of protruding portions 33B having the spiral shape be formed such that the tip thereof has a width decreasing from the inner peripheral portion toward the outer peripheral portion, as with the protruding portions 13B in the first embodiment described above.

Furthermore, in the present modification example, an adhesive 34 used to join the wheel substrate 11 and the cover glass 33 together is charged into a groove portion 33C. The groove portion 33C is provided on the inner side (groove portion 33Ca) of some of the plurality of protruding portions 33B and is also provided at an outer edge portion (33Cb) of the cover glass 33. The groove portion 33Cb is provided to form a continuing groove at the outer edge portion of the cover glass 33. As described above, the groove portion on the cover glass may be provided such that a plurality of groove portions is provided in a partial manner as in the first embodiment described above, or may be so formed as to make a circuit the outer edge portion as in the present modification example.

3-2. Modification Example 2

Figure 13:
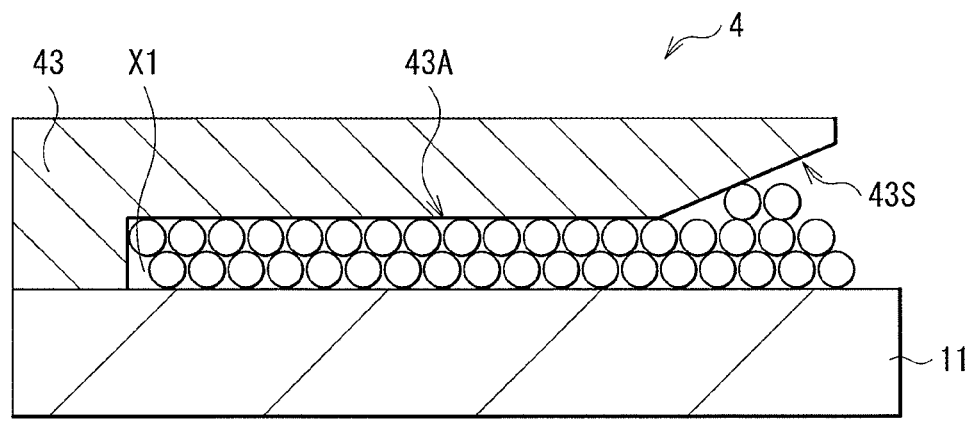
FIG. 13 is a cross-sectional schematic view of a configuration of a main portion of a phosphor wheel according to modification example 2 of the present disclosure.

FIG. 13 is a schematic view of a cross-sectional configuration of a main portion of a phosphor wheel 4 according to modification example 2 of the present disclosure. The phosphor wheel 4 according to the present modification example differs from the first embodiment described above or the like in that a sloped surface 43S (taper) is provided on an end surface of the cover glass 43 on the inner peripheral portion side, specifically, on an end surface of the cover glass 43 that corresponds to a charging slot for the phosphor particle 121.

As described above, with the sloped surface 43S being provided on the end surface of the cover glass 43 that serves as a charging slot for the phosphor particle 121, it is possible to provide an effect of allowing the phosphor particle 121 to be easily charged into the space X1 formed by the wheel substrate 11 and the recessed portion 43A provided in the cover glass 32, in addition to the effect obtained with the first embodiment described above.

3-3. Modification Example 3

Figure 14:
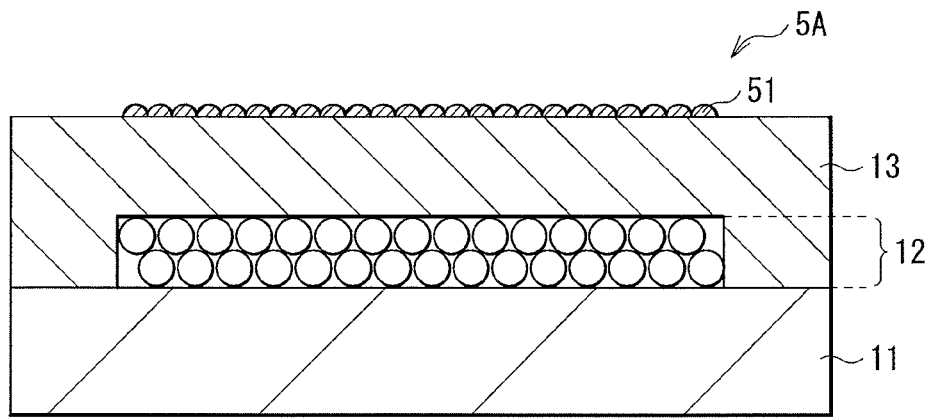
FIG. 14 is a cross-sectional schematic view of a configuration of a main portion of a phosphor wheel according to modification example 3 of the present disclosure.
Figure 15:
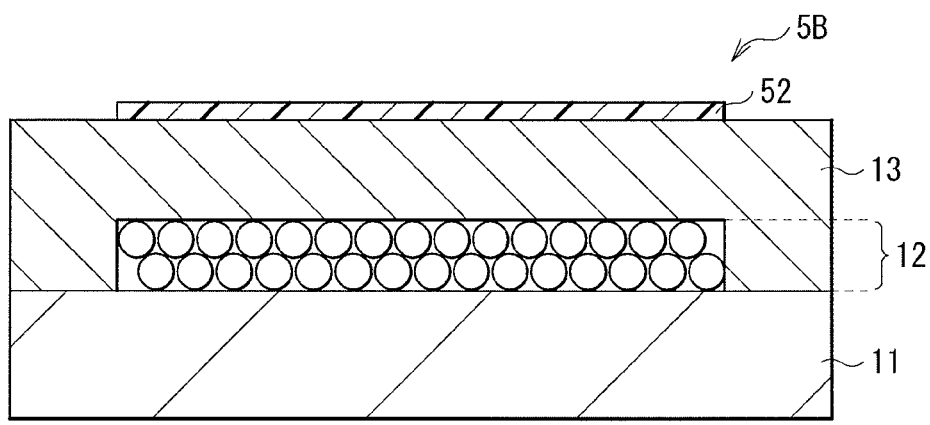
FIG. 15 is a cross-sectional schematic view of the configuration of the main portion of the phosphor wheel according to the modification example 3 of the present disclosure.
Figure 16:
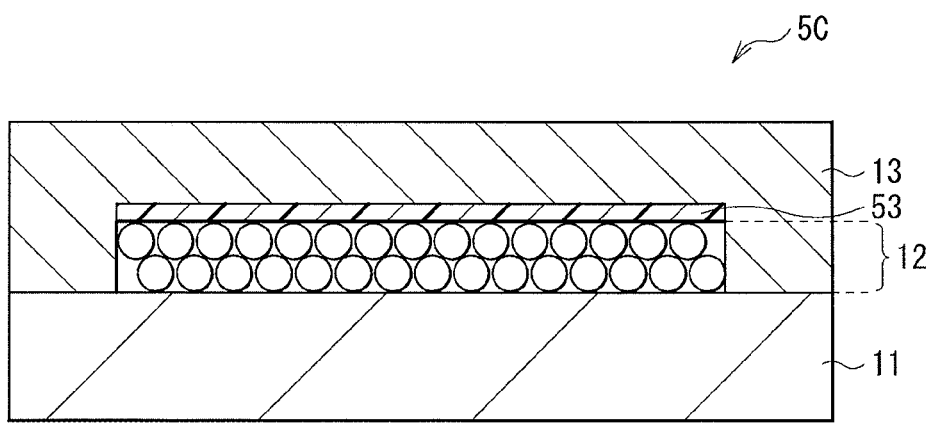
FIG. 16 is a cross-sectional schematic view of the configuration of the main portion of the phosphor wheel according to the modification example 3 of the present disclosure.

FIGS. 14 to 16 are each a schematic view of a cross-sectional configuration of a main portion of corresponding one of phosphor wheels 5A, 5B, and 5C according to modification example 3 of the present disclosure. The present modification example is one example of a phosphor wheel in which a thin optical film is provided on a surface of the cover glass 13 described above or between the phosphor layer 12 and the cover glass 13.

The phosphor wheel 5A illustrated in FIG. 14 and the phosphor wheel 5B illustrated in FIG. 15 each include a thin optical film provided on a surface of the cover glass 13 and having a diffusing function. Specifically, the phosphor wheel 5A has a configuration in which a microscopic asperity structure 51 is provided on a surface of the cover glass 13. The phosphor wheel 5B has a configuration in which a nano-particle diffusing layer 52 is provided on the surface of the cover glass 13. As described above, with the thin optical film (or an optical structure) having a diffusing function being provided on the surface of the cover glass 13, it is possible to provide an effect of allowing a display performance to improve, in addition to the effect obtained with the first embodiment described above. Specifically, for example, in the projector 10 using these phosphor wheels 5A and 5B, it is possible to reduce unevenness or speckle in blue light of projected image.

The phosphor wheel 5C illustrated in FIG. 16 includes a dichroic film 53 provided between the phosphor layer 12 and the cover glass 13. The dichroic film 53 has, for example, a function of reflecting the excitation light EL at a certain ratio. With this dichroic film 53 being provided between the phosphor layer 12 and the cover glass 13, it is possible to reduce a distance between a fluorescent-light outputting surface and a diffusing surface. This makes it possible to provide an effect of allowing efficiency (efficiency in converting light) of the illumination optical system to improve, in addition to the effect obtained with the first embodiment described above.

It should be noted that the asperity structure 51 and the nano-particle diffusing layer 52 do not necessarily have to be provided on the entire surface of the cover glass 13. It is sufficient that they are provided at least in and around a region that includes a location irradiated with the excitation light EL. Similarly, the dichroic film 53 does not necessarily have to be provided on the entire bottom surface of the recessed portion 13A. It is sufficient that the dichroic film 53 is provided at least in and around the region that includes the location irradiated with the excitation light EL.

3-4. Modification Example 4

Figure 17:
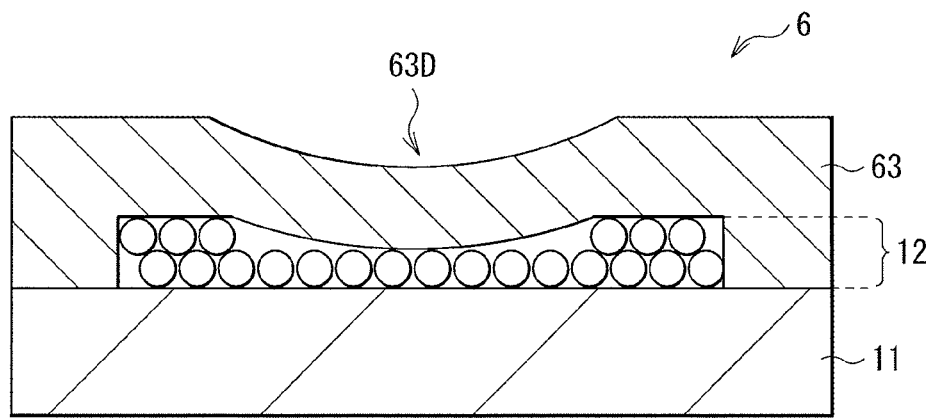
FIG. 17 is a cross-sectional schematic view of an example of a configuration of a main portion of a phosphor wheel according to modification example 4 of the present disclosure.

FIG. 17 is a schematic view of an example of a cross-sectional configuration of a main portion of a phosphor wheel 6 according to modification example 4 of the present disclosure. The phosphor wheel 6 according to the present modification example differs from the first embodiment described above and the like in that a recessed structure 63D protruding toward the wheel substrate 11 side is provided, for example, at a position of the cover glass 63 where the excitation light EL is irradiated, in other words, at a position that corresponds to an exciting position of the phosphor layer 12.

As described above, in the binderless phosphor wheel, variation in thickness of the phosphor portion leads to variation in output of fluorescent light. In the binderless phosphor wheel, as the thickness of the phosphor layer increases, in other words, as a plurality of phosphor particles overlaps in a direction in which the excitation light EL enters, there is a possibility that efficiency in outputting light as a light source deteriorates. Therefore, it is preferable that the phosphor layer have a thickness of about one or two layers of phosphor particles being stacked in a direction in which the excitation light EL enters. However, irradiation with the excitation light EL generates heat in the phosphor portion. This may cause thermal expansion of the cover glass, which deforms the phosphor layer, for example, in a direction in which the thickness of the phosphor layer increases.

In contrast, in the present modification example, the recessed structure 63D protruding toward the wheel substrate 11 side is provided, for example, at a position, of the cover glass 63, corresponding to a location where the excitation light EL is irradiated. This allows the cover glass 63 to thermally deform so as to protrude toward the phosphor layer 12 side in a case of thermal expansion due to heat generated in the phosphor layer 12, which makes it possible to prevent the volume of the space X1 forming the phosphor layer 12 from expanding. Therefore, with the phosphor wheel 6 according to the present modification example, it is possible to provide an effect of reducing a degradation of efficiency in outputting light as a light source, in addition to the effect obtained with the first embodiment described above.

Figure 18:
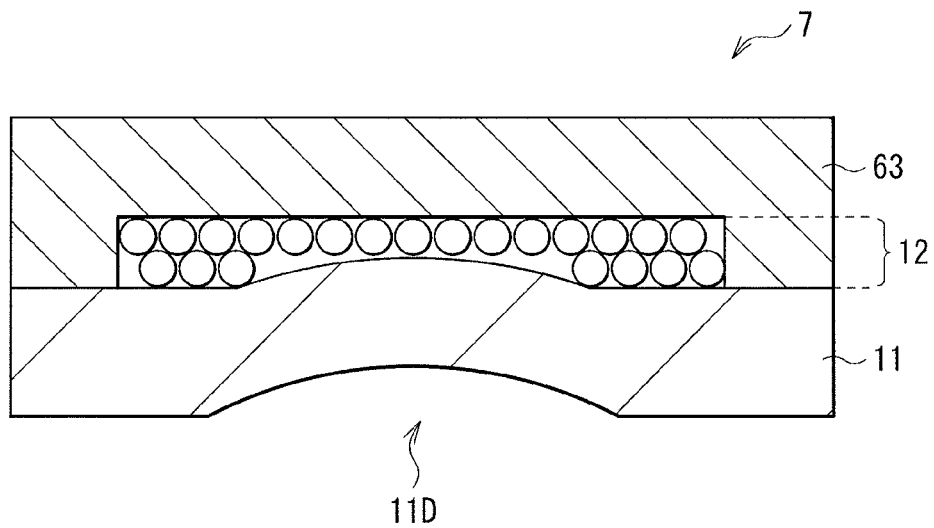
FIG. 18 is a cross-sectional schematic view of another example of the configuration of the main portion of the phosphor wheel according to the modification example 4 of the present disclosure.

It should be noted that the workings described above are not limited to be obtained in a case where the recessed structure 63D is provided in the cover glass 63 as with the phosphor wheel 6 described above. For example, as with a phosphor wheel 7 illustrated in FIG. 18, for example, a recessed structure 11D protruding toward the cover glass 63 side may be formed at a position, of the wheel substrate 11, corresponding to a portion where the excitation light EL is irradiated. This makes it possible to obtain a working and effect similar to those of the phosphor wheel 6.

3-5. Modification Example 5

Figure 19:
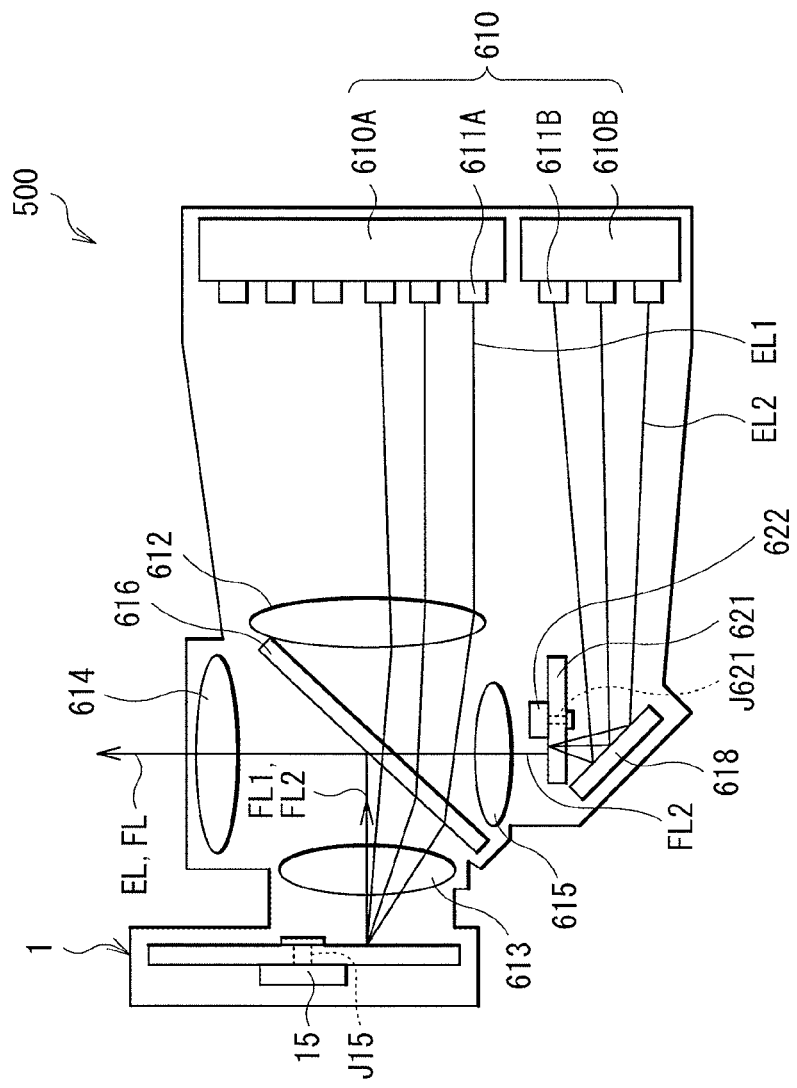
FIG. 19 is a schematic view of a configuration example of a light source unit according to modification example 5 of the present disclosure.

FIG. 19 is a schematic view of an overall configuration of a light source unit 500 according to modification example 5 of the present disclosure. This light source unit 500 is used, for example, as a light source unit of the projector 10 illustrated in FIG. 8.

The light source unit 500 includes the phosphor wheel 1 described above, a diffusing plate 621, a light source section 610 that emits excitation light or laser light, lenses 612 to 615, a dichroic mirror 616, and a reflecting mirror 617. The phosphor wheel 1 includes, for example, a reflective wavelength conversion device. The phosphor wheel 1 is supported in a rotatable manner by the shaft J15. The diffusing plate 621 is supported in a rotatable manner by a shaft J621. The light source section 610 includes a first laser group 610A and a second laser group 610B. The first laser group 610A includes a plurality of semiconductor laser devices 611A that oscillate excitation light (for example, with a wavelength of 445 nm or 455 nm). The second laser group 610B includes a plurality of semiconductor laser devices 611B that oscillate blue laser light (for example, with a wavelength of 465 nm). Here, for the purpose of convenience, the "EL1" represents excitation light oscillated from the first laser group 610A, and the "EL2" represents blue laser light (hereinafter, simply referred to as blue light) oscillated from the second laser group 610B.

In the present modification example, the phosphor wheel 1 is so disposed that the excitation light EL1 that has sequentially traveled from the first laser group 610A through the lens 612, the dichroic mirror 616, and the lens 613 enters the phosphor layer 12. Fluorescent light FL1 from the phosphor wheel 1 is reflected by the dichroic mirror 616. After this, the fluorescent light FL1 passes through the lens 614 and travels toward the outside, in other words, toward the illumination optical system 200. The diffusing plate 621 is provided to diffuse the blue light EL2 that has passed from the second laser group 610B through the reflecting mirror 617. The blue light EL2 diffused by the diffusing plate 621 passes through the lens 615 and the dichroic mirror 616. After this, the blue light EL2 passes through the lens 614 and travels toward the outside, in other words, toward the illumination optical system 200. Note that the light source unit 500 may include therein a cooling fan to cool the heat generated in the phosphor layer 12 in association with irradiation with the excitation light EL1.

Next, operation of the projector 10 including the light source unit 500 will be described with reference to FIGS. 8 and 19.

First, in the light source unit 500, the motor 15 and a motor 622 drive to cause the phosphor wheel 1 and the diffusing plate 621 to rotate. After this, the excitation light EL1 and the blue light EL2 are oscillated from the first laser group 610A and the second laser group 610B of the light source section 610.

The excitation light EL1 is oscillated from the first laser group 610A, and passes sequentially through the lens 612, the dichroic mirror 616, and the lens 613. After this, the excitation light EL1 is applied to the phosphor layer 12 of the phosphor wheel 1. The phosphor layer 12 absorbs a portion of the excitation light EL1 to convert it into the fluorescent light FL1, which is yellow light. The fluorescent light FL1 is outputted toward the lens 613. The fluorescent light FL1 and the fluorescent light FL2 are reflected by the dichroic mirror 616, and pass through the lens 614 toward the illumination optical system 200.

The blue light EL2 is oscillated from the second laser group 610B, and passes through the reflecting mirror 617. The blue light EL2 is thereafter applied to the diffusing plate 621. The diffusing plate 621 diffuses the blue light EL2, and outputs it toward the lens 615. The blue light EL2 passes through the dichroic mirror 616, and then passes through the lens 614 toward the illumination optical system 200.

As described above, the light source unit 500 causes white light obtained through combination of the fluorescent light FL (FL1), which is yellow light, and the blue light (EL2), to enter the illumination optical system 200.

These are descriptions of the present disclosure referring to the first and second embodiments and the modification examples 1 to 5. However, the present disclosure is not limited to the embodiments and the like described above. Various modifications are possible. For example, the material, the thickness, and the like of each of the layers described above in the embodiments are merely examples, and are non-limiting. Other material and thickness may be used.

In addition, a device other than the projector may be used to configure the projection-type display apparatus according to the present technology. For example, the first embodiment has been described above by referring to a reflective 3LCD-type projector using a reflective liquid crystal panel as an optical modulation element, which is non-limiting. It is possible to apply the present technology also to a so-called transmissive-type 3LCD projector using a transmissive liquid crystal panel.

Furthermore, with the present technology, a light source unit according to the present technology may be used in an apparatus other than a projection-type display apparatus. For example, the light source unit 100 according to the present disclosure may be used for an illumination application. For example, it is possible to apply the light source unit 100 according to the present disclosure to a headlamp for an automobile or a light source for lighting-up.

It should be noted that it is possible for the present technology to have the following configurations.

(1)

A wavelength conversion device including:

a first base member;

a second base member opposed to the first base member, the second base member having a surface opposed to the first base member, the surface having an annular recessed portion, the recessed portion including therein a plurality of protruding portions extending from an inner peripheral portion toward an outer peripheral portion; and a phosphor layer with which a first space is filled, the first space being formed by the first base member and the recessed portion of the second base member.

(2)

The wavelength conversion device according to (1) described above, in which the protruding portion has a planar shape having a width decreasing from the inner peripheral portion toward the outer peripheral portion.

(3)

The wavelength conversion device according to (2) described above, in which the protruding portion has a planar shape having a beveled portion in an end surface on inner peripheral portion side.

(4)

The wavelength conversion device according to any one of (1) to (3) described above, in which the plurality of protruding portions is disposed straightly from the inner peripheral portion toward the outer peripheral portion.

(5)

The wavelength conversion device according to (4) described above, in which the plurality of protruding portions each have a planar shape having an oval shape having a major axis extending from the inner peripheral portion toward the outer peripheral portion.

(6)

The wavelength conversion device according to any one of (1) to (5) described above, in which the plurality of protruding portions is disposed spirally from the inner peripheral portion toward the outer peripheral portion.

(7)

The wavelength conversion device according to any one of (1) to (6) described above, in which the second base member has a taper on an end surface between the plurality of protruding portions.

(8)

The wavelength conversion device according to any one of (1) to (7) described above, in which the second base member includes a surface having a groove portion, the surface being opposed to the first base member, and the groove portion is filled with an adhesive.

(9)

The wavelength conversion device according to (8) described above, in which the groove portion is provided in the protruding portion to form a second space separately from the first space.

(10)

The wavelength conversion device according to (8) or (9) described above, in which the groove portion is provided at an outer edge of the outer peripheral portion of the second base member.

(11)

The wavelength conversion device according to any one of (1) to (10) described above, in which the second base member has an air hole in a side surface of the recessed portion on inner peripheral side, in a side surface of the recessed portion on outer peripheral side, or both.

(12)

The wavelength conversion device according to any one of (1) to (11) described above, in which the phosphor layer includes a plurality of phosphor particles.

(13)

The wavelength conversion device according to (11) or (12) described above, in which the phosphor layer includes a plurality of phosphor particles, and the air hole has a hole diameter equal to or less than 50 percent of an average particle size of the phosphor particles.

(14)

The wavelength conversion device according to any one of (1) to (13) described above, in which the first base member, the second base member, or both have a light transmissive property.

(15)

The wavelength conversion device according to (14) described above, in which the base member having the light transmissive property has a surface having a recessed structure.

(16)

The wavelength conversion device according to (14) described above, in which the base member having the light transmissive property has a surface having a structure having a light diffusing function.

(17)

The wavelength conversion device according to (16) described above, in which the structure having the light diffusing function includes a microscopic asperity structure or a nano-particle diffusing layer.

(18)

The wavelength conversion device according to any one of (1) to (17) described above, in which the second base member has a light transmissive property, and a dichroic film is formed on a portion or all of a bottom surface of the recessed portion, the dichroic film reflecting a predetermined wavelength at a certain ratio.

(19)

A projection-type display apparatus including:

a light-source optical system that includes a wavelength conversion device;

an image-generation optical system that modulates light from the light-source optical system on the basis of an inputted image signal to generate image light; and a projection optical system that projects the image light generated in the image-generation optical system, the wavelength conversion device including a first base member, a second base member opposed to the first base member, the second base member having a surface opposed to the first base member, the surface having an annular recessed portion, the recessed portion including therein a plurality of protruding portions extending from an inner peripheral portion toward an outer peripheral portion, and a phosphor layer with which a first space is filled, the first space being formed by the first base member and the recessed portion of the second base member.

The present application claims priority based on Japanese Patent Application No. 2017-194977 filed with the Japan Patent Office on Oct. 5, 2017, the entire contents of which are incorporated herein by reference.

It should be understood that those skilled in the art would make various modifications, combinations, sub-combinations, and alterations depending on design requirements and other factors, and they are within the scope of the attached claims or the equivalents thereof.

What is claimed is:

1. A wavelength conversion device, comprising:
a first base member;
a second base member opposed to the first base member, the second base member having a surface opposed to the first base member, the surface having an annular recessed portion, the recessed portion including therein a plurality of protruding portions extending from an inner peripheral portion toward an outer peripheral portion; and
a phosphor layer with which a first space is filled, the first space being formed by the first base member and the recessed portion of the second base member.

2. The wavelength conversion device according to claim 1, wherein the protruding portions have a planar shape having a width decreasing from the inner peripheral portion toward the outer peripheral portion.

3. The wavelength conversion device according to claim 2, wherein the protruding portions have a planar shape having a beveled portion in an end surface on inner peripheral portion side.

4. The wavelength conversion device according to claim 1, wherein the protruding portions are disposed straightly from the inner peripheral portion toward the outer peripheral portion.

5. The wavelength conversion device according to claim 4, wherein the protruding portions each have a planar shape having an oval shape having a major axis extending from the inner peripheral portion toward the outer peripheral portion.

6. The wavelength conversion device according to claim 1, wherein the protruding portions are disposed spirally from the inner peripheral portion toward the outer peripheral portion.

7. The wavelength conversion device according to claim 1, wherein the second base member has a taper on an end surface between the protruding portions.

8. The wavelength conversion device according to claim 1, wherein the second base member includes a surface having a groove portion, the surface being opposed to the first base member, and the groove portion is filled with an adhesive.

9. The wavelength conversion device according to claim 8, wherein the groove portion is provided in the protruding portion to form a second space separately from the first space.

10. The wavelength conversion device according to claim 8, wherein the groove portion is provided at an outer edge of the outer peripheral portion of the second base member.

11. The wavelength conversion device according to claim 1, wherein the second base member has an air hole in a side surface of the recessed portion on inner peripheral side, in a side surface of the recessed portion on outer peripheral side, or both.

12. The wavelength conversion device according to claim 1, wherein the phosphor layer includes a plurality of phosphor particles.

13. The wavelength conversion device according to claim 11, wherein
the phosphor layer includes a plurality of phosphor particles, and
the air hole has a hole diameter equal to or less than 50 percent of an average particle size of the phosphor particles.

14. The wavelength conversion device according to claim 1, wherein the first base member, the second base member, or both have a light transmissive property.

15. The wavelength conversion device according to claim 14, wherein the base member has the light transmissive property, and wherein the base member has a surface having a recessed structure.

16. The wavelength conversion device according to claim 14, wherein the base member has the light transmissive property, and wherein the base member has a surface having a structure having a light diffusing function.

17. The wavelength conversion device according to claim 16, wherein the structure having the light diffusing function includes a microscopic asperity structure or a nano-particle diffusing layer.

18. The wavelength conversion device according to claim 1, wherein
the second base member has a light transmissive property, and
a dichroic film is formed on a portion or all of a bottom surface of the recessed portion, the dichroic film reflecting a predetermined wavelength at a certain ratio.

19. A projection-type display apparatus, comprising:
a light-source optical system that includes a wavelength conversion device;
an image-generation optical system that modulates light from the light-source optical system on a basis of an inputted image signal to generate image light; and
a projection optical system that projects the image light generated in the image-generation optical system, the wavelength conversion device including:
  a first base member,
  a second base member opposed to the first base member, the second base member having a surface opposed to the first base member, the surface having an annular recessed portion, the recessed portion including therein a plurality of protruding portions extending from an inner peripheral portion toward an outer peripheral portion, and
  a phosphor layer with which a first space is filled, the first space being formed by the first base member and the recessed portion of the second base member.

* * * * *